US006505300B2

(12) United States Patent
Chan et al.

(10) Patent No.: US 6,505,300 B2
(45) Date of Patent: *Jan. 7, 2003

(54) METHOD AND SYSTEM FOR SECURE RUNNING OF UNTRUSTED CONTENT

(75) Inventors: Shannon Chan, Bellevue, WA (US); Gregory Jensenworth, Redmond, WA (US); Mario C. Goertzel, Kirkland, WA (US); Bharat Shah, New Castle, WA (US); Michael M. Swift, Seattle, WA (US); Richard B. Ward, Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,218

(22) Filed: Jun. 12, 1998

(65) Prior Publication Data

US 2002/0019941 A1 Feb. 14, 2002

(51) Int. Cl.[7] .............................................. G06F 01/24
(52) U.S. Cl. ..................... 713/164; 713/165; 713/166; 713/167; 709/229
(58) Field of Search ................. 713/164–167, 713/200–201, 162; 710/240; 709/229

(56) References Cited

U.S. PATENT DOCUMENTS

| 4,962,449 A | | 10/1990 | Schlesinger |
| 5,138,712 A | | 8/1992 | Corbin |
| 5,276,901 A | | 1/1994 | Howell et al. |
| 5,321,841 A | * | 6/1994 | East et al. ................. 709/107 |
| 5,390,247 A | * | 2/1995 | Fischer ....................... 713/167 |
| 5,412,717 A | * | 5/1995 | Fischer ....................... 713/167 |
| 5,506,961 A | | 4/1996 | Carlson et al. |

(List continued on next page.)

FOREIGN PATENT DOCUMENTS

| EP | 0 398 645 | 11/1990 |
| EP | 0 465 016 | 1/1992 |
| EP | 0 588 415 | 3/1994 |
| EP | 0 697 662 | 2/1996 |
| EP | 0 813 133 | 12/1997 |
| WO | WO 96/05549 | 2/1996 |
| WO | WO 96/13113 | 5/1996 |
| WO | WO 97/15008 | 4/1997 |
| WO | WO 97/26734 | 7/1997 |

OTHER PUBLICATIONS

Frost, J. "Windows NT Security", pp. 1–6, dated May 4, 1995 retrieved form the Internet <http://world.std.com/jimf/papers/nt–security/nt–security.html> on May 28, 2001.*

(List continued on next page.)

Primary Examiner—Thomas R. Peeso
(74) Attorney, Agent, or Firm—Law Offices of Albert S. Michalik, PLLC

(57) ABSTRACT

Restricted execution contexts are provided for untrusted content, such as computer code or other data downloaded from websites, electronic mail messages and any attachments thereto, and scripts or client processes run on a server. A restricted process is set up for the untrusted content, and any actions attempted by the content are subject to the restrictions of the process, which may be based on various criteria. Whenever a process attempt to access a resource, a token associated with that process is compared against security information of that resource to determine if the type of access is allowed. The security information of each resource thus determines the extent to which the restricted process, and thus the untrusted content, has access. In general, the criteria used for setting up restrictions for each untrusted content's process is information indicative of how trusted or untrusted the content is likely to be.

50 Claims, 19 Drawing Sheets

U.S. PATENT DOCUMENTS

| | | | |
|---|---|---|---|
| 5,542,046 A | | 7/1996 | Carlson et al. |
| 5,638,448 A | | 6/1997 | Nguyen |
| 5,649,099 A | | 7/1997 | Theimer et al. |
| 5,675,782 A | | 10/1997 | Montague et al. |
| 5,678,041 A | | 10/1997 | Baker et al. |
| 5,680,461 A | * | 10/1997 | McManis ................... 713/167 |
| 5,682,478 A | | 10/1997 | Watson et al. |
| 5,745,676 A | | 4/1998 | Hobson et al. |
| 5,757,916 A | | 5/1998 | MacDoran et al. |
| 5,761,669 A | | 6/1998 | Montague et al. |
| 5,812,784 A | | 9/1998 | Watson et al. |
| 5,826,029 A | | 10/1998 | Gore et al. |
| 5,845,067 A | | 12/1998 | Porter et al. |
| 5,922,073 A | | 7/1999 | Shimada |
| 5,925,109 A | | 7/1999 | Bartz |
| 5,940,591 A | | 8/1999 | Boyle |
| 5,941,947 A | | 8/1999 | Brown et al. |
| 5,949,882 A | | 9/1999 | Angelo |
| 5,983,270 A | | 11/1999 | Abraham et al. |
| 5,983,350 A | * | 11/1999 | Minear et al. .............. 713/201 |
| 6,081,807 A | | 6/2000 | Story et al. |
| 6,105,132 A | | 8/2000 | Fritch et al. |

OTHER PUBLICATIONS

Asche, Ruediger R., "The Guts of Security", pp. 1–19, dated May 9, 1995, retrieved from the Internet <http://msdn.microsoft.com/library/techart/medn_secguts.htm> on May 28, 2001.*

Asche, Ruediger R. "Windows Security in Theory and Practice", pp. 1–10, dated May 9, 1995, retrieved from the Internet <http://msdn.microsoft.com/library/techart/msdn_seccpp.htm> on May 28, 2001.*

Soshi et al., *The Saga Security System: A Security Architecture for Open Distributed Systems*, IEEE, pp 53–5 (1997).

Anonymous, "Apache suEXEC Support," (describes the Apache HTTP Server Version 1.3 dating from Jun. 5, 1998 as documented in Written Opinion for PCT Application No. PCT/US99/12912), http://www.apache.org/docs/suexec.html printed Jul. 24, 2000.

Anonymous, "Apache Virtual Host documentation," (describes the Apache HTTP Server Version 1.3 dating fr Jun. 5, 1998 as documented in Written Opinion for PCT Application No. PCT/US99/12912), http://www.apache.org/docs/vhosts/index.html, printed Jul. 24, 2000.

Bell Telephone Laboratories Incorporated, *UNIX™ Time-Sharing System: UNIX Programmer's Manual*, 7$^{th}$ Edition, vol. 1, Chmod(1), SU(1), Exec(2) (Jan. 1979).

Copy of Written Opinion in Corresponding PCT Application No. PCT/ US99/12912 dated Mar. 3, 2000.

Copy of International Search Report in Corresponding PCT Application No. PCT/US99/12912 dated May 11, 1999.

"Java Security Model: Java Protection Domains," http://java.sun.com/security/handout.html, printed Nov. 11, 1999.

Anon, "Privilege Control Mechanism for UNIX Systems," *IBM Technical Disclosure Bulletin*, vol. 34, No. 7b pp. 477–479, Dec. 1991.

Erdos et al., "Security Reference Model for the Java Developer's Kit 1.0.2," *Java Security Reference Model*, Nov. 13, 1996, http://www.javasoft.com/security/SRM.html printed Jul. 14, 1999.

Fritzinger et al., "Java Security," 1996, http://java.sun.com/security/whitepaper.txt.

Fritzinger et al., "Java Security," 1996, http://java.sun.com/security/whitepaper.ps.

Goldberg et al., "A Secure Environment for Untrusted Helper Applications: Confining the Wily Hacker," *Sixt USENIX Security Symposium*, Jul. 22–25, 1996, http://www.usenix.org/publications/library/proceedings/sec9.

Goldstein, Ted, "The Gateway Security Model in the Java Commerce Client," *The Source for Java$^{198}$Technology*, 1997, http://www.java.com/products/commerce/docs/whitepapers/security/JCC_gateway.html printed Jul. 14, 1999.

Maziers, David and M. Frans Kaashoek, "Secure Applications Need Flexible Operating Systems," *6th Workshop on Hot Topics in Operating Systems (HotOS–VI)*, May 5–6, 1997, http://www.eecs.harvard.edu/hotos/.

Neuman et al., "Kerberos: An Authentication Service for Computer Networks," *IEEE Communicaitons Magazine*, pp. 33–38, Sep. 1, 1994.

* cited by examiner

METHOD AND SYSTEM FOR SECURE RUNNING OF UNTRUSTED CONTENT

FIELD OF THE INVENTION

The invention relates generally to computer systems, and more particularly to improvements in security for computer systems.

BACKGROUND OF THE INVENTION

Historically, executable content could only installed on a computer system by physically bringing magnetic media to the computer and having someone with administrative privileges install it. At present, however, the Internet has made it very easy and popular for ordinary computer users to download executable content such as programs, HTML pages and controls. In many cases, executable content may be downloaded and executed via the Internet without the user even realizing that such an event took place. Similarly, computer users may receive electronic mail or news containing files that include executable content, such as executable programs and/or documents containing macros, and moreover, the mail or news itself may be an HTML page. Opening such a message or an attachment therein exposes the recipient's system to whatever executable content is present.

Unfortunately, such executable content is often unruly, e.g., it may be malicious and intentionally destroy data on the client machine, error-prone and cause the client machine to crash, or well-intentioned but careless and divulge confidential information about the client. Although these types of computer problems have previously existed in the form of "viruses" and "trojans," the ubiquitous presence of World Wide Web has made these problems widespread, and in some cases out of control.

On the server side, web servers launch server programs such as CGI scripts on behalf of clients and return data from the programs back to the clients. The source of such scripts is not necessarily carefully controlled, nor are all such scripts well written. As a result, poorly written CGI scripts have caused web server machines to crash or to slow down by using too many computer resources. Moreover, poorly written server programs may be tricked by a malicious client into performing actions it should not do, such as executing other applications or writing or reading data to or from storage. Lastly, some web servers even allow a client program to send scripts to the server to be executed on the client's behalf, posing many dangers.

In general, client and server operating environments are not adequately protected against unruly executable content. At the same time, because so much executable content is valuable, the need to be able to receive and run executable content continues to grow despite the inherent risks of untrusted content.

SUMMARY OF THE INVENTION

Briefly, the present invention provides restricted execution contexts for untrusted content (such as executable code, dynamic HTML, Java or Active-X controls) that restricts the resources that the content may access. A restricted process is set up for untrusted content, and any actions attempted by the content are subject to the restrictions of the process, which are based on various criteria. Whenever a process attempts to access a resource, a restricted token associated with each process is compared against security information of the resource to determine if the type of access is allowed. The resource's security information thus determines whether a process, and thus the untrusted content, may access the resource, and if so, the type of access that is allowed.

Untrusted content includes data downloaded from websites, and each such site has a restricted process set up therefor based on the site identity and the zone in which the site is categorized. APIs and helper processes enable the website to access its own site, files and registry keys, while ACLs on other resources not related to the site restrict the access of that site as desired, based on the site identity, zone or other criteria. Other untrusted content includes electronic mail messages or news along with any attachments thereto. Such content is similarly run in a restricted execution context wherein the restrictions are based on criteria such as the identity of the sender. Servers also may run untrusted content such as scripts and client processes in restricted execution contexts, whereby the restrictions may be based on criteria such as the script author, the method of client authentication used, and/or any other information available to the server indicative of how trusted or untrusted the content may be.

Other advantages will become apparent from the following detailed description when taken in conjunction with the drawings, in which:

DETAILED DESCRIPTION

Exemplary Operating Environment

Figure 1:
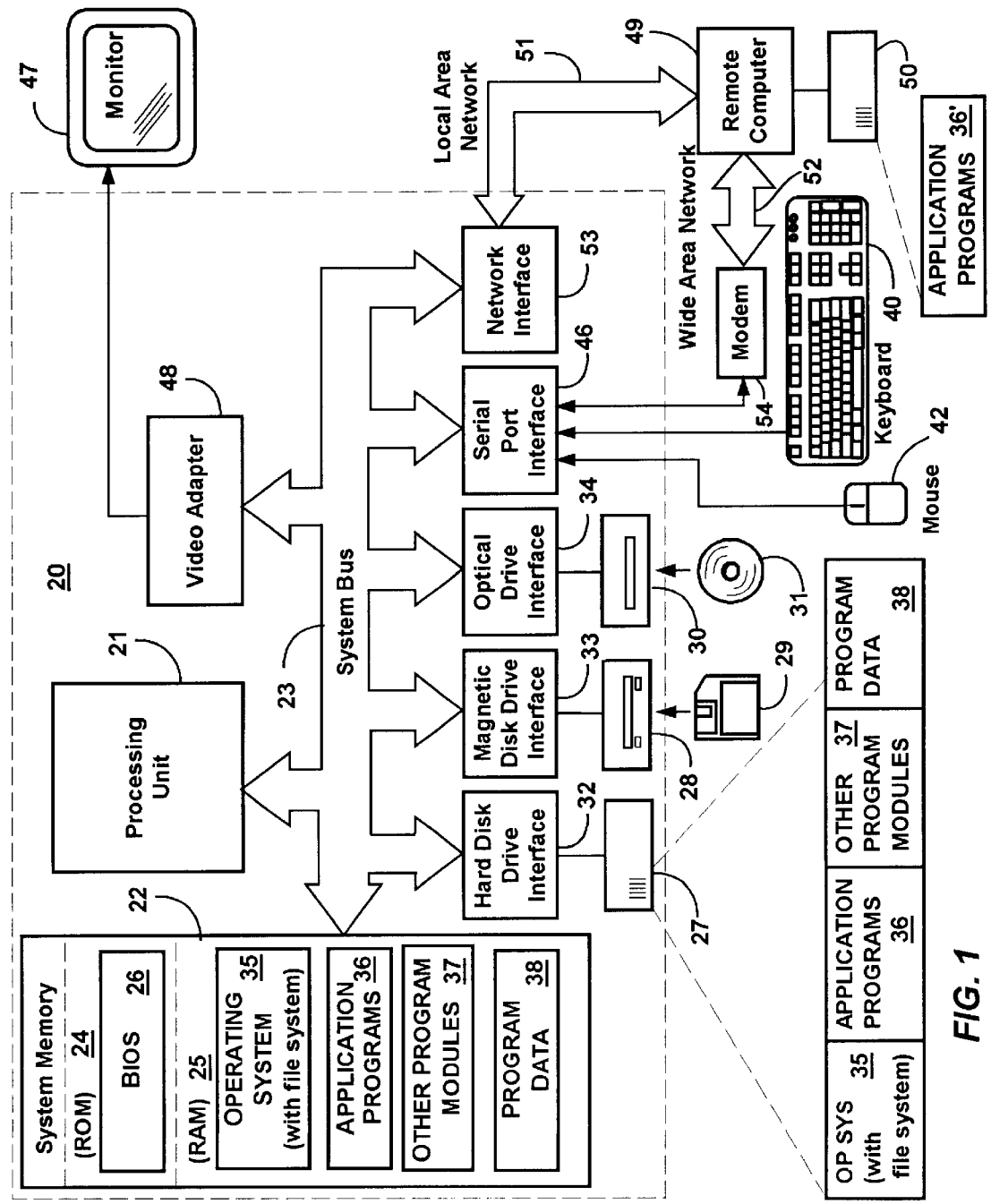
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The General Security Model

The preferred security model of the present invention is described herein with reference to the Windows NT security model. Notwithstanding, there is no intention to limit the present invention to the Windows NT operating system, but on the contrary, the present invention is intended to operate with and provide benefits with any mechanism that performs security checks at the operating system level. In addition, the present invention may also be used with software-fault isolation on a per-thread basis, or with a virtual machine where restrictions are determined from the stack of classes currently executing. Moreover, the present invention does not necessarily depend on kernel-mode operation, as with software-fault isolation or a virtual machine it may be implemented in user-mode.

In general, in the Windows NT operating system, a user performs tasks by accessing the system's resources via processes (and their threads). For purposes of simplicity herein, a process and its threads will be considered conceptually equivalent, and will thus hereinafter simply be referred to as a process. Also, the system's resources, including files, shared memory and physical devices, which in Windows NT are represented by objects, will be ordinarily referred to as either resources or objects herein.

When a user logs on to the Windows NT operating system and is authenticated, a security context is set up for that user, which includes building an access token 60. As shown in the left portion of FIG. 2, a conventional user-based access token 60 includes a UserAndGroups field 62 including a security identifier (Security ID, or SID) 64 based on the user's credentials and one or more group IDs 66 identifying groups (e.g., within an organization) to which that user belongs. The token 60 also includes a privileges field 68 listing any privileges assigned to the user. For example, one such privilege may give an administrative-level user the ability to set the system clock through a particular application programming interface (API). Note that privileges override access control checks, described below, that are otherwise performed before granting access to an object.

Figure 3:
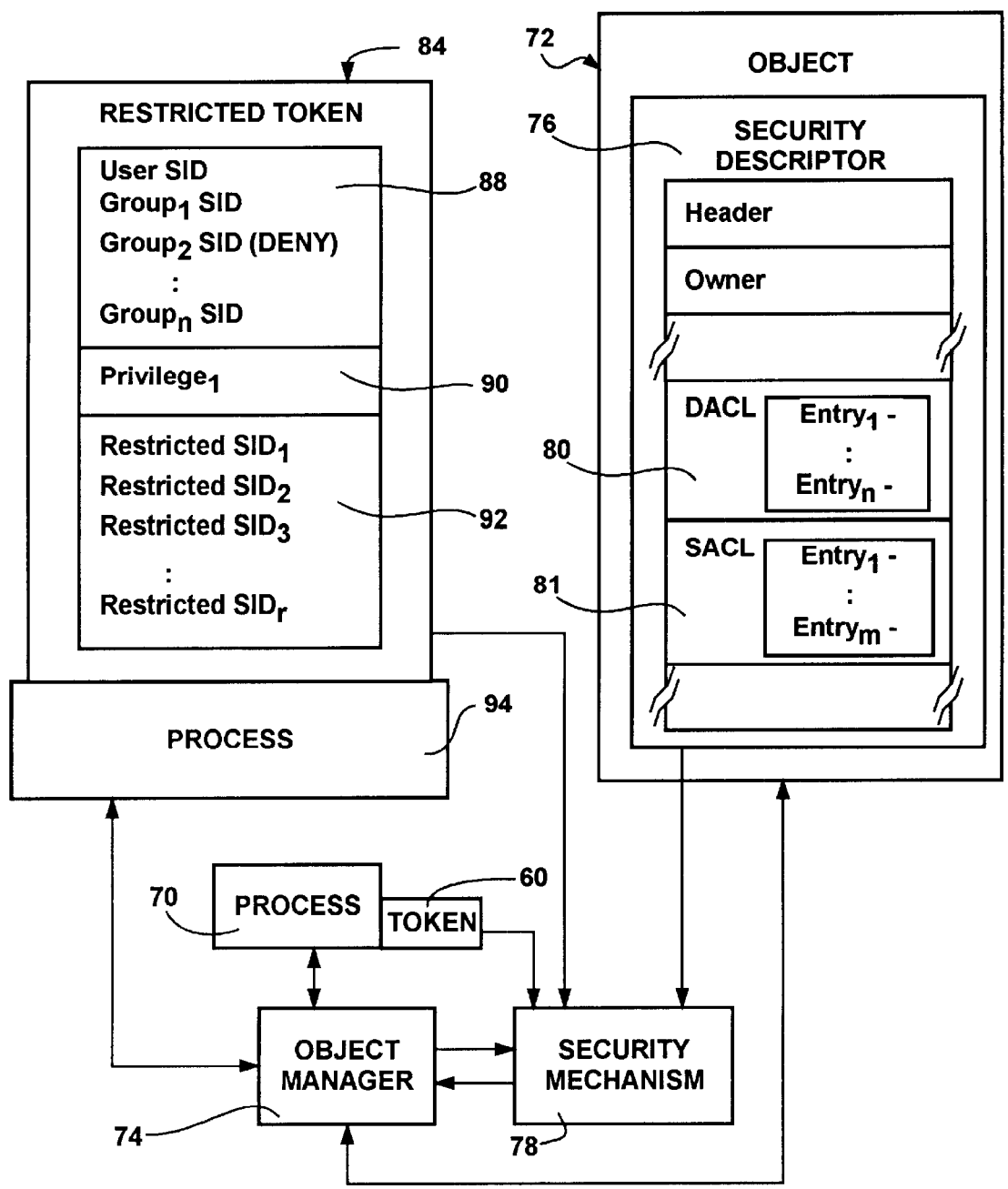
FIG. 3 is a block diagram generally representing the various components for determining whether a process may access a resource.

As will be described in more detail below and as generally represented in FIG. 3, a process 70 desiring access to an object 72 specifies the type of access it desires (e.g., obtain read/write access to a file object) and at the operating system (e.g., kernel) level provides its associated token 60 to an object manager 74. The object 72 has a security descriptor 76 associated therewith, and the object manager 74 provides the security descriptor 76 and the token 60 to a security mechanism 78. The contents of the security descriptor 76 are typically determined by the owner (e.g., creator) of the object, and generally comprise a (discretionary) access control list (ACL) 80 of access control entries, and for each entry, one or more access rights (allowed or denied actions) corresponding to that entry. Each entry comprises a type (deny or allow) indicator, flags, a security identifier (SID) and access rights in the form of a bitmask wherein each bit corresponds to a permission (e.g., one bit for read access, one for write and so on). The security mechanism 78 compares the security IDs in the token 60 along with the type of action or actions requested by the process 70 against the entries in the ACL 80. If a match is found with an allowed user or group, and the type of access desired is allowable for the user or group, a handle to the object 72 is returned to the process 70, otherwise access is denied.

By way of example, a user with a token identifying the user as a member of the "Accounting" group may wish to access a particular file object with read and write access. If the file object has the "Accounting" group identifier of type allow in an entry of its ACL 80, and the group has rights enabling read and write access, a handle granting read and write access is returned, otherwise access is denied. Note that for efficiency reasons, the security check is performed only when the process 70 first attempts to access the object 72 (create or open), and thus the handle to the object stores the type of access information so as to limit the actions that can be performed therethrough.

The security descriptor 76 also includes a system ACL, or SACL 81, which comprises entries of type audit corresponding to client actions that are to be audited. Flags in each entry indicate whether the audit is monitoring successful or failed operations, and a bitmask in the entry indicates the type of operations that are to be audited. A security ID in the entry indicates the user or group being audited. For example, consider a situation wherein a particular group is being audited so as to determine whenever a member of that group that does not have write access to a file object attempts to write to that file. The SACL 81 for that file object includes an audit entry having the group security identifier therein along with an appropriately set fail flag and write access bit. Whenever a client belonging to that particular group attempts to write to the file object and fails, the operation is logged.

Note that the ACL 80 may contain one or more identifiers that are marked for denying users of groups access (as to all rights or selected rights) rather than granting access thereto. For example, one entry listed in the ACL 80 may otherwise allow members of "Group$_3$" access to the object 72, but another entry in the ACL 80 may specifically deny "Group$_{24}$" all access. If the token 60 includes the "Group$_{24}$" security ID, access will be denied regardless of the presence of the "Group$_3$" security ID. Of course to function properly, the security check is arranged so as to not allow access via the "Group$_3$" entry before checking the "DENY ALL" status of the Group$_{24}$ entry, such as by placing all DENY entries at the front of the ACL 80. As can be appreciated, this arrangement provides for improved efficiency, as one or more isolated members of a group may be separately excluded in the ACL 80 rather than having to individually list each of the remaining members of a group to allow their access.

Note that instead of specifying a type of access, a caller may request a MAXIMUM_ALLOWED access, whereby an algorithm determines the maximum type of access allowed, based on the normal UserAndGroups list versus each of the entries in the ACL 80. More particularly, the algorithm walks down the list of identifiers accumulating the rights for a given user (i.e., OR-ing the various bitmasks). Once the rights are accumulated, the user is given the accumulated rights. However, if during the walkthrough a deny entry is found that matches a user or group identifier and the requested rights, access is denied.

Restricted Tokens

A restricted token is created from an existing access token (either restricted or unrestricted) as described below. As also described below, if the restricted token includes any restricted security IDs, the token is subject to an additional access check wherein the restricted security IDs are compared against the entries in the object's ACL.

The primary use of a restricted token is for a process to create a new process with a restricted version of its own token. The restricted process is then limited in the actions it may perform on resources. For example, a file object resource may have in its ACL a single restricted SID identifying the Microsoft Word application program, such that only restricted processes having the same Microsoft Word restricted SID in its associated restricted token may access the file object. Note that the original user still needs to have access to the object, so to access it, the ACL also needs to contain an access control entry granting the user access, as well as the Microsoft Word program. Then, for example, untrusted code such as downloaded via a browser could be run in a restricted process that did not have the Microsoft Word restricted Security ID in its restricted token, preventing that code's access to the file object.

For security reasons, creating a process with a different token normally requires a privilege known as the SeAssignPrimaryToken privilege. However, to allow processes to be associated with restricted tokens, process management allows one process with sufficient access to another process to modify its primary token to a restricted token, if the restricted token is derived from the primary token. By comparing the ParentTokenId of the new process's token with the TokenId of the existing process' token, the operating system 35 may ensure that the process is only creating a restricted version of itself.

A restricted token 84 has less access than its parent token, and may, for example, prevent access to an object based on the type of process (as well as the user or group) that is attempting to access the object, instead of simply allowing or denying access solely based on the user or group information. A restricted token may also not allow access via one or more user or group security IDs specially marked as "USE_FOR_DENY_ONLY," even though the parent token allows access via those SIDs, and/or may have privileges removed that are present in the parent token.

Thus, one way in which to reduce access is to change an attribute of one or more user and/or group security identifiers in a restricted token so as to be unable to allow access, rather than grant access therewith. Security IDs marked USE_FOR_DENY_ONLY are effectively ignored for purposes of granting access, however, an ACL that has a "DENY" entry for that security ID will still cause access to be denied. By way of example, if the Group$_2$ security ID in the restricted token 84 (FIG. 3) is marked USE_FOR_DENY_ONLY, when the user's process attempts to access an object 72 having the ACL 80 that lists Group$_2$ as allowed, that entry is effectively ignored and the process will have to gain access by some other security ID. However, if the ACL 80 includes an entry listing Group$_2$ as DENY with respect to the requested type of action, then once tested, no access will be granted regardless of other security IDs.

Note that access to objects cannot be safely reduced by simply removing a security ID from a user's token, since that security ID may be marked as "DENY" in the ACL of some objects, whereby removing that identifier would grant rather than deny access to those objects. Thus, a SID's attributes may be modified to USE_FOR_DENY_ONLY in a restricted token. Moreover, no mechanism is provided to turn off this USE_FOR_DENY_ONLY security check.

Another way to reduce access in a restricted token is to remove one or more privileges relative to the parent token. For example, a user having a normal token with administrative privileges may set up a system such that unless that user specifically informs the system otherwise, the user's processes will run with a restricted token having no privileges. As can be appreciated, this prevents inadvertent errors that may occur when the user is not intentionally acting in an administrative capacity. Similarly, programs may be developed to run in different modes depending on a user's privileges, whereby an administrative-level user has to run the program with administrative privileges to perform some operations, but operate with reduced privileges to perform more basic operations. Again, this helps to prevent serious errors that might otherwise occur when such a user is simply attempting to perform normal operations but is running with elevated privileges.

Yet another way to reduce a token's access is to add restricted security IDs thereto. Restricted security IDs are numbers representing processes, resource operations and the like, made unique such as by adding a prefix to GUIDs or numbers generated via a cryptographic hash or the like, and may include information to distinguish these Security IDs from other Security IDs. Although not necessary to the invention, for convenience, various application programming interfaces (APIs) are provided to interface applications and users with Security IDs, such as to accomplish a GUID to Security ID conversion, represent the Security IDs in human readable form, and so on.

In addition to restricting access to a resource based on the application (process) requesting access, specific Security IDs may be developed based on likely restricted uses of a resource. By way of example, a Security ID such as "USE_WINDOWS" would be placed in the default ACLs of windowstations and the desktop to allow access thereto only by a process having a corresponding SID in its restricted token. Similarly, the default ACL of a printer object may include a USE_PRINTING SID in its default ACL, so that a process could create a restricted process with only this Security ID listed in its restricted token, whereby the restricted process would be able to access the printer but no other resource. As can be appreciated, numerous other Security IDs for accessing other resources may be implemented.

As shown in FIG. 3, restricted security IDs are placed in a special field 82 of a restricted token 84, such as for identifying a process that is requesting an action. As described in more detail below, by requiring that both at least one user (or group) security ID and at least one restricted security ID be granted access to an object, an object may selectively grant access based on a requesting process (as well as a user or group). For example, an object such as a file object may allow Microsoft Word, Microsoft Excel or Windows Explorer processes to access it, but deny access to any other process. Moreover, each of the allowed processes may be granted different access rights.

The design provides for significant flexibility and granularity within the context of a user to control what different processes are allowed to do. One usage model for these features, described in detail below, includes a distinction between trusted applications and untrusted applications. Note that the term "application" is used in a generic sense to describe any piece of code that may be executed in "user mode" under a given security context. For example, an application such as Microsoft Word may run as a process from an ActiveX control, which may be loaded into an existing process and executed. Applications which launch other applications, such as Microsoft's Internet Explorer, may introduce a "trust model" using this infrastructure.

By way of example, and as described in more detail below, an application such as Internet Explorer can use restricted tokens to execute untrusted executable code under different processes, and control what those processes can do within the user's overall access rights and privileges. To this end, the Internet Explorer application creates a restricted token from its own token, and determines which restricted security IDs will be placed in the restricted token. Then, the untrusted executable code is restricted to accessing only those objects that the restricted context may access.

Moreover, entries corresponding to restricted SIDs and other restrictions may be placed in a field of the SACL 81 for auditing purposes. For example, the SACL of a resource may be set up to audit each time that Internet Explorer program attempts read or write access of that resource, and/or the use of SIDs marked USE_FOR_DENY_ONLY may be audited. For purposes of simplicity, auditing will not be described in detail hereinafter, however it can be readily appreciated that the concepts described with respect to access control via restricted SIDs are applicable to auditing operations.

To create a restricted token from an existing token, an application programming interface (API) is provided, named NtFilterToken, as set forth below:

```
NTSTATUS
NtFilterToken (
    IN HANDLE ExistingTokenHandle,
    IN ULONG Flags,
    IN PTOKEN_GROUPS SidsToDisable OPTIONAL,
    IN PTOKEN_PRIVILEGES PrivilegesToDelete OPTIONAL,
    IN PTOKEN_GROUPS RestrictingSids OPTIONAL,
    OUT PHANDLE NewTokenHandle
    );
```

The NtFilterToken API is wrapped under a Win32 API named CreateRestrictedToken, further set forth below:

```
WINADVAPI
BOOL
APIENTRY
CreateRestrictedToken(
    IN HANDLE ExistingTokenHandle,
    IN DWORD Flags,
    IN DWORD DisableSidCount,
    IN PSID_AND_ATTRIBUTES SidsToDisable OPTIONAL,
    IN DWORD DeletePrivilegeCount,
    IN PLUID_AND_ATTRIBUTES PrivilegesToDelete OPTIONAL,
    IN DWORD RestrictedSidCount,
    IN PSID_AND_ATTRIBUTES SidsToRestrict OPTIONAL,
    OUT PHANDLE NewTokenHandle
    );
```

Figure 2:
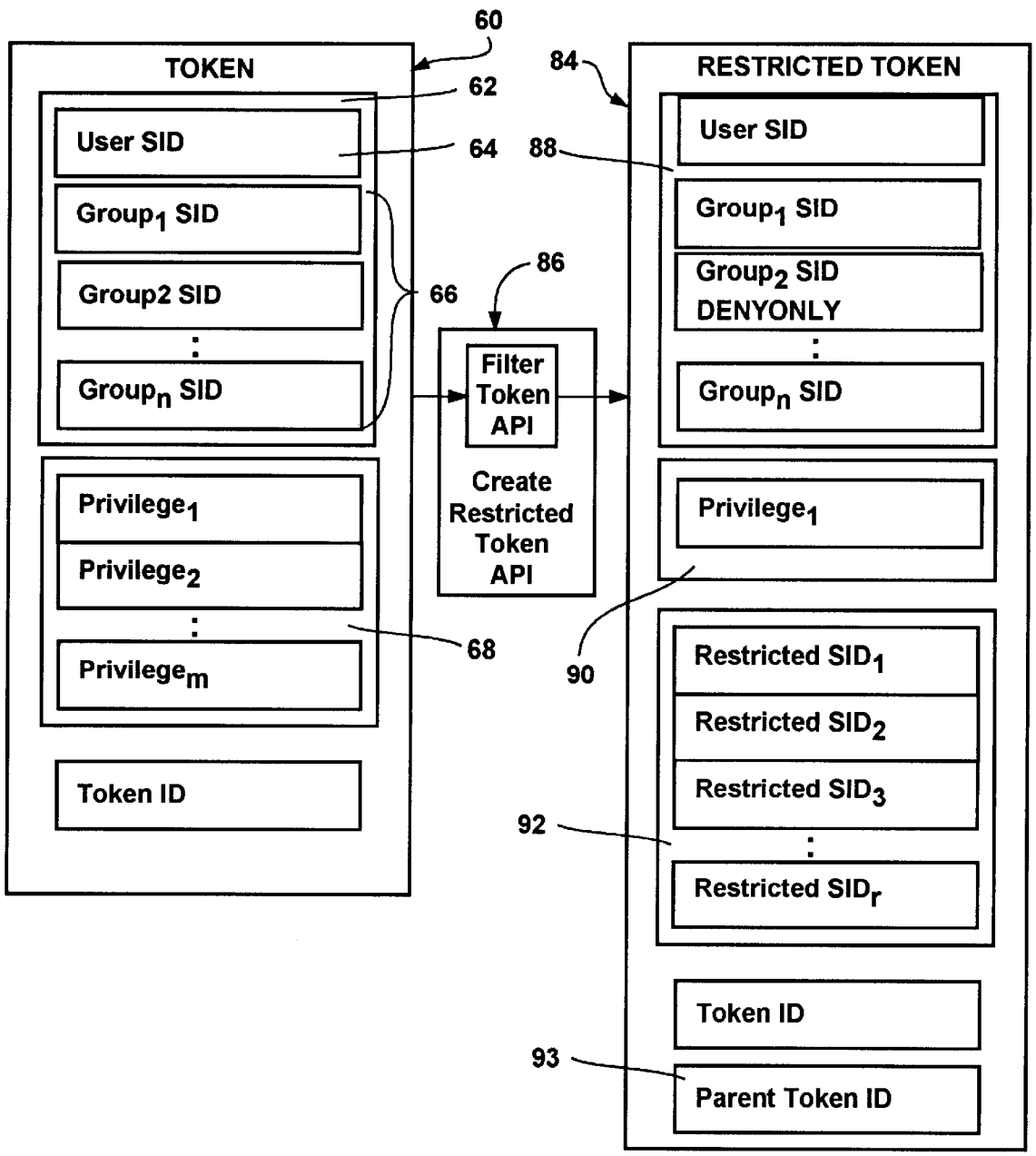
FIG. 2 is a block diagram generally representing the creation of a restricted token from an existing token.
Figure 4A:
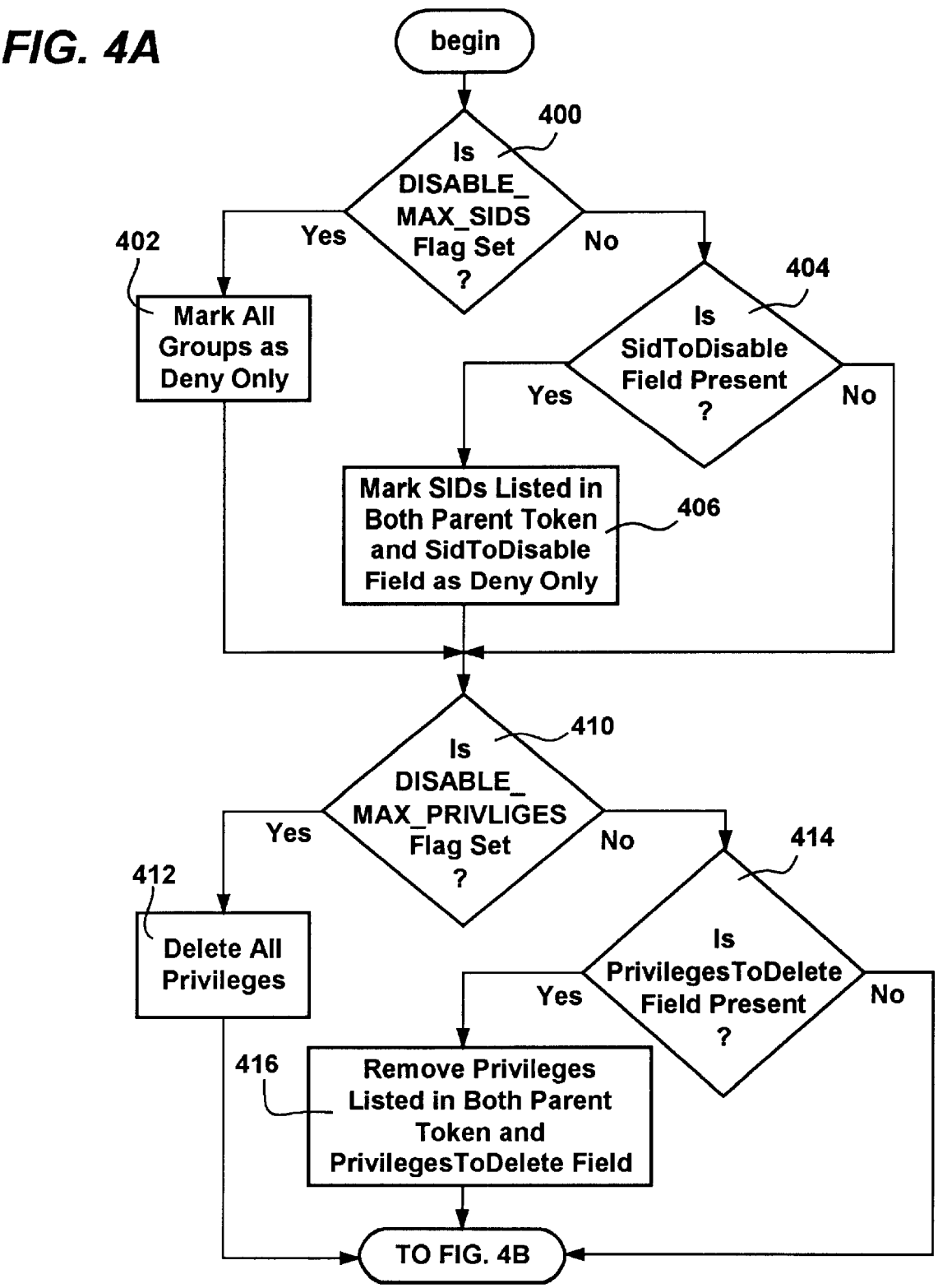
FIGS. 4A–4B comprise a flow diagram representing the general steps taken to create a restricted token from an existing token.
Figure 4B:
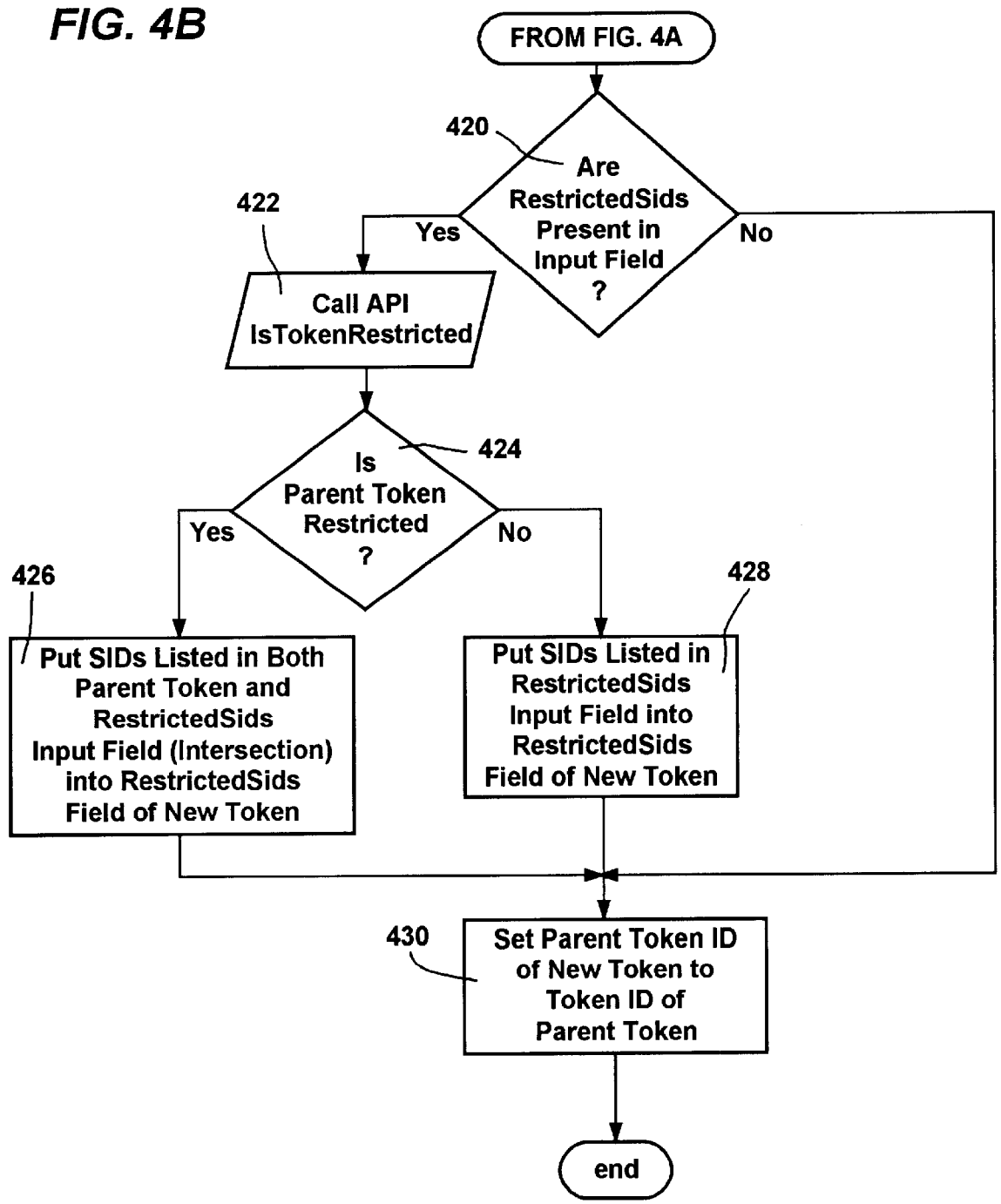

As represented in FIGS. 2 and 4A–4B, these APIs 86 work in conjunction to take an existing token 60, either restricted or unrestricted, and create a modified (restricted) token 84 therefrom. The structure of a restricted token, which contains the identification information about an instance of a logged-on user, includes three new fields, ParentTokenId, RestrictedSidCount and RestrictedSids (shown in boldface below):

```
Typedef struct _TOKEN {
    TOKEN_SOURCE TokenSource;              // Ro: 16-Bytes
    LUID TokenId;                          // Ro: 8-Bytes
    LUID AuthenticationId;                 // Ro: 8-Bytes
    LUID ParentTokenId;                    // Ro: 8-Bytes
    LARGE_INTEGER ExpirationTime;          // Ro: 8-Bytes
    LUID ModifiedId;                       // Wr: 8-Bytes
    ULONG UserAndGroupCount;               // Ro: 4-Bytes
    ULONG RestrictedSidCount;              // Ro: 4-Bytes
    ULONG PrivilegeCount;                  // Ro: 4-Bytes
    ULONG VariableLength;                  // Ro: 4-Bytes
    ULONG DynamicCharged;                  // Ro: 4-Bytes
    ULONG DynamicAvailable;                // Wr: 4-Bytes (Mod)
    ULONG DefaultOwnerIndex;               // Wr: 4-Bytes (Mod)
    PSID_AND_ATTRIBUTES                    // Wr: 4-Bytes (Mod)
        UserAndGroups;
    PSID_AND_ATTRIBUTES                    // Ro: 4-Bytes
        RestrictedSids;
    PSID PrimaryGroup;                     // Wr: 4-Bytes (Mod)
    PLUID_AND_ATTRIBUTES Privileges;       // Wr: 4-Bytes (Mod)
    PULONG DynamicPart;                    // Wr: 4-Bytes (Mod)
    PACL DefaultDacl;                      // Wr: 4-Bytes (Mod)
    TOKEN_TYPE TokenType;                  // Ro: 1-Byte
    SECURITY_IMPERSONATION_LEVEL
        ImpersonationLevel;                // Ro: 1-Byte
    UCHAR TokenFlags;                      // Ro: 4-Bytes
    BOOLEAN TokenInUse;                    // Wr: 1-Byte
    PSECURITY_TOKEN_PROXY_                 // Ro: 4-Bytes
        DATA ProxyData;
    PSECURITY_TOKEN_AUDIT_                 // Ro: 4-Bytes
        DATA AuditData;
    ULONG VariablePart;                    // Wr: 4-Bytes (Mod)
}TOKEN, * PTOKEN;
```

Note that when a normal (non-restricted) token is now created, via a CreateToken API, the RestrictedSids field is empty, as is the ParentTokenId field.

To create a restricted token 84, a process calls the CreateRestrictedToken API with appropriate flag settings and/or information in the input fields, which in turn invokes the NtFilterToken API. As represented beginning at step 400 of FIG. 4A, the NtFilterToken API checks to see if a flag named DISABLE_MAX_SIDS is set, which indicates that all Security IDs for groups in the new, restricted token 84 should be marked as USE_FOR_DENY_ONLY. The flag provides a convenient way to restrict the (possibly many) groups in a token without needing to individually identify each of the groups. If the flag is set, step 400 branches to step 402 which sets a bit indicating USE_FOR_DENY_ONLY on each of the group security IDs in the new token 84.

If the DISABLE_MAX_SIDS flag is not set, then step 400 branches to step 404 to test if any security IDs are individually listed in a SidsToDisable Field of the NtFilterToken API. As shown at step 404 of FIG. 4A, when the optional SidsToDisable input field is present, at step 406, any Security IDs listed therein that are also present in the UserAndGroups field 62 of the parent token 60 are individually marked as USE_FOR_DENY_ONLY in the UserAndGroups field 88 of the new restricted token 84. As described above, such Security IDs can only be used to deny access and cannot be used to grant access, and moreover, cannot later be removed or enabled. Thus, in the example shown in FIG. 2, the Group$_2$ security ID is marked as USE_FOR_DENY_ONLY in the restricted token 84 by having specified the Group$_2$ security ID in the SidsToDisable input field of the NtFilterToken API 86.

The filter process then continues to step 410 of FIG. 4A, wherein a flag named DISABLE_MAX_PRIVILEGES is tested. This flag may be similarly set as a convenient shortcut to indicate that all privileges in the new, restricted token 84 should be removed. If set, step 410 branches to step 412 which deletes all privileges from the new token 84.

If the flag is not set, step 410 branches to step 414 wherein the optional PrivilegesToDelete field is examined. If present when the NtFilterToken API 86 is called, then at step 416, any privileges listed in this input field that are also present in the privileges field 68 of the existing token 60 are individually removed from the privileges field 90 of the new token 84. In the example shown in FIG. 2, the privileges shown as "Privilege$_2$" to "Privilege$_m$" have been removed from the privileges field 90 of the new token 84 by having specified those privileges in the PrivilegesToDelete input field of the NtFilterToken API 86. This provides the ability to reduce the privileges available in a token. The process continues to step 420 of FIG. 4B.

When creating a restricted token 84, if SIDs are present in the RestrictingSids input field at step 420, then a determination is made as to whether the parent token is a normal token or is itself a restricted token having restricted SIDs. An API, IsTokenRestricted is called at step 422, and resolves this question by querying (via the NtQueryInformationToken API) the RestrictingSids field of the parent token to see if it is not NULL, whereby if not NULL, the parent token is a restricted token and the API returns a TRUE. If the test is not satisfied, the parent token is a normal token and the API returns a FALSE. Note that for purposes of the subsequent steps 426 or 428, a parent token that is restricted but does not have restricted SIDs (i.e., by having privileges removed and/or USE_FOR_DENY_ONLY SIDs) may be treated as being not restricted.

At step 424, if the parent token is restricted, step 424 branches to step 426 wherein any security IDs that are in both the parent token's restricted Security ID field and the API's restricted Security ID input list are put into the restricted Security ID field 92 of the new token 84. Requiring restricted security IDs to be common to both lists prevents a restricted execution context from adding more security IDs to the restricted Security ID field 92, an event which would effectively increase rather than decrease access. Similarly, if none are common at step 426, any token created still has to be restricted without increasing the access thereof, such as by leaving at least one restricted SID from the original token in the new token. Otherwise, an empty restricted SIDs field in the new token might indicate that the token is not restricted, an event which would effectively increase rather than decrease access.

Alternatively, if at step 424 the parent token is determined to be a normal token, then at step 428 the RestrictingSids field 92 of the new token 84 is set to those listed in the input field. Note that although this adds security IDs, access is actually decreased since a token having restricted SIDs is subject to a secondary access test, as described in more detail below.

Lastly, step 430 is also executed, whereby the ParentTokenId 93 in the new token 84 is set to the TokenId of the existing (parent) token. This provides the operating system with the option of later allowing a process to use a restricted version of its token in places that would not normally be allowed except to the parent token.

Figure 5:
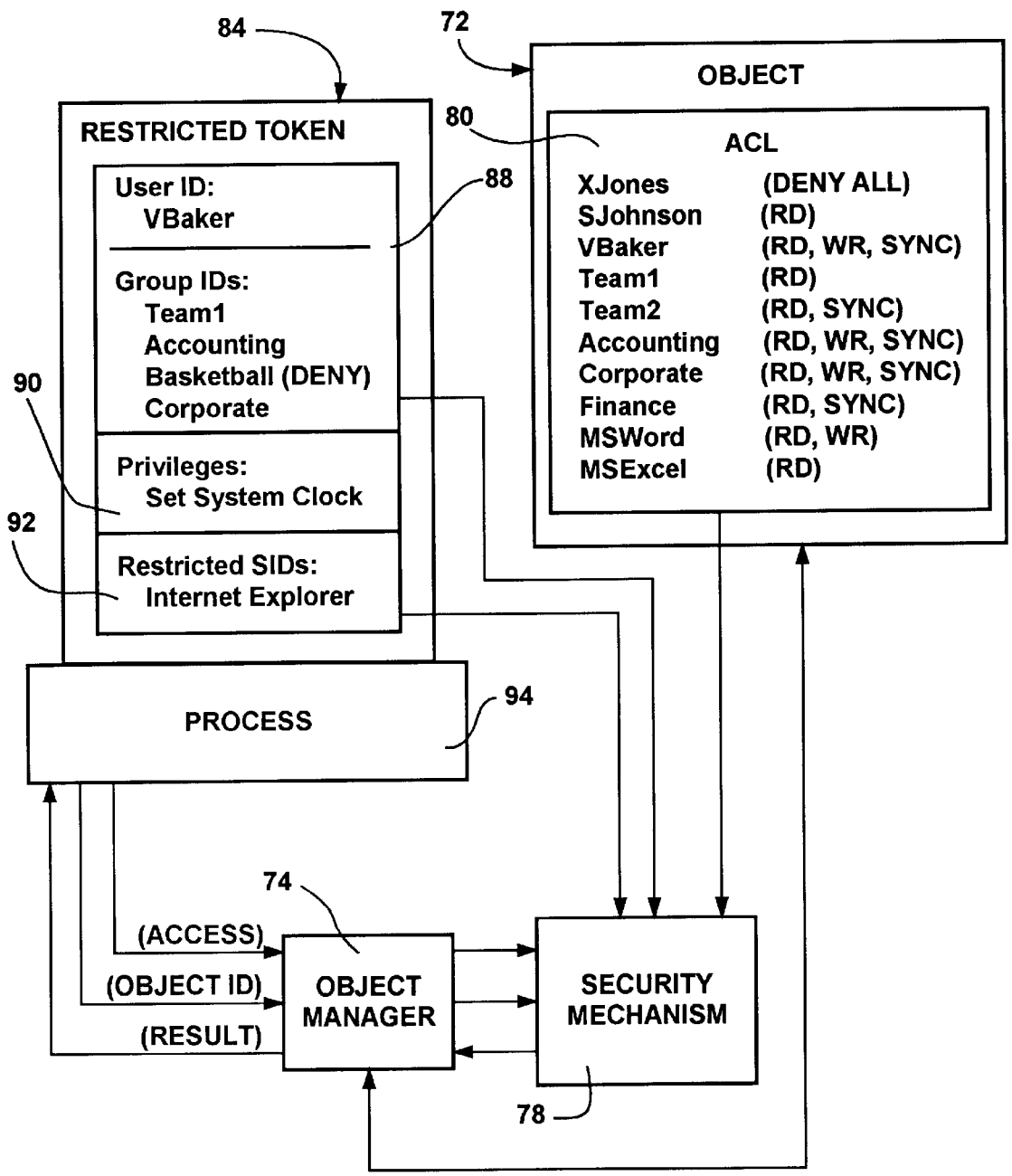
FIG. 5 is a block diagram generally representing a process having a restricted token associated therewith attempting to access a resource.
Figure 6:
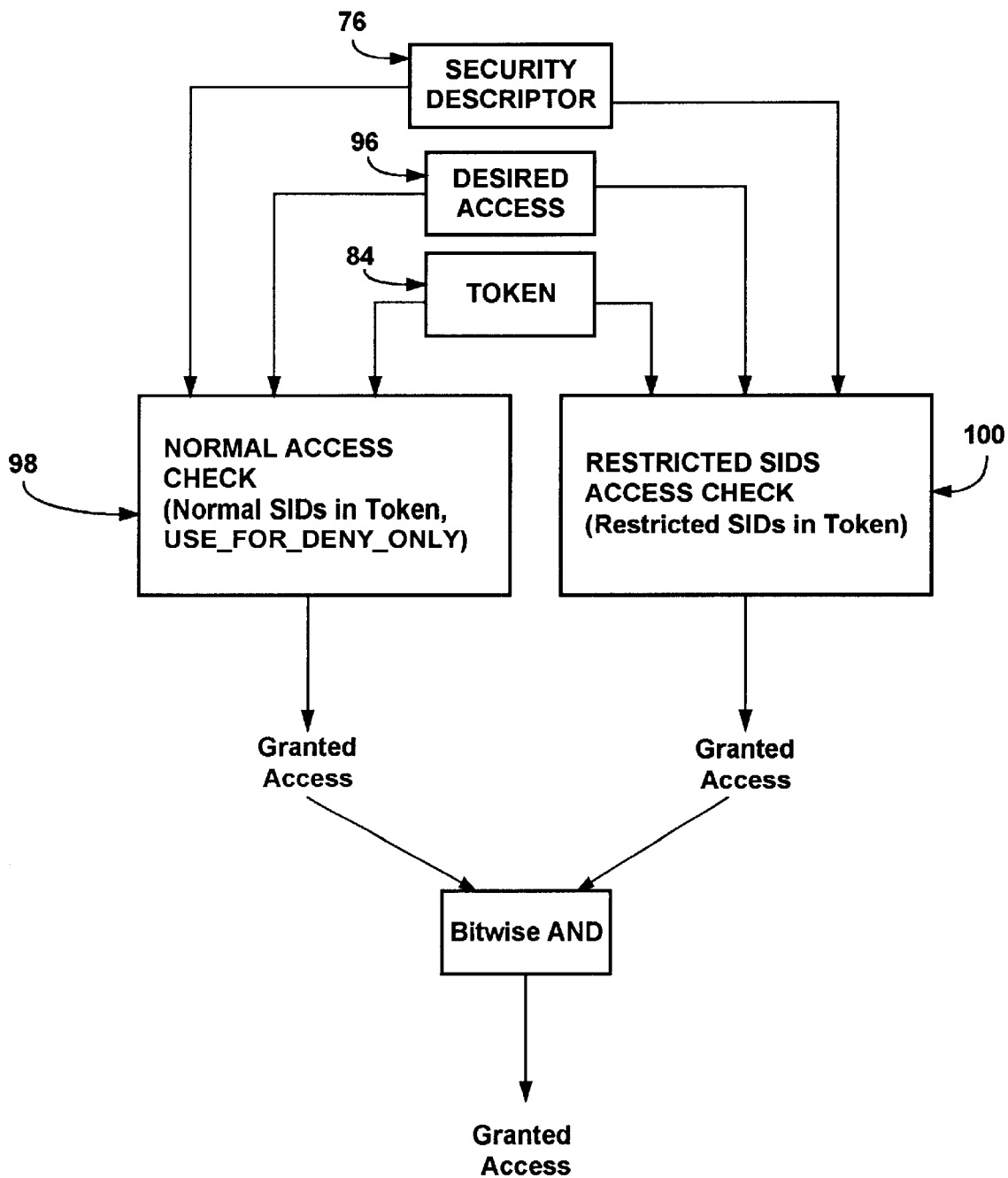
FIG. 6 is a block diagram generally representing the logic for determining access to an object of a process having a restricted token associated therewith.
Figure 7:
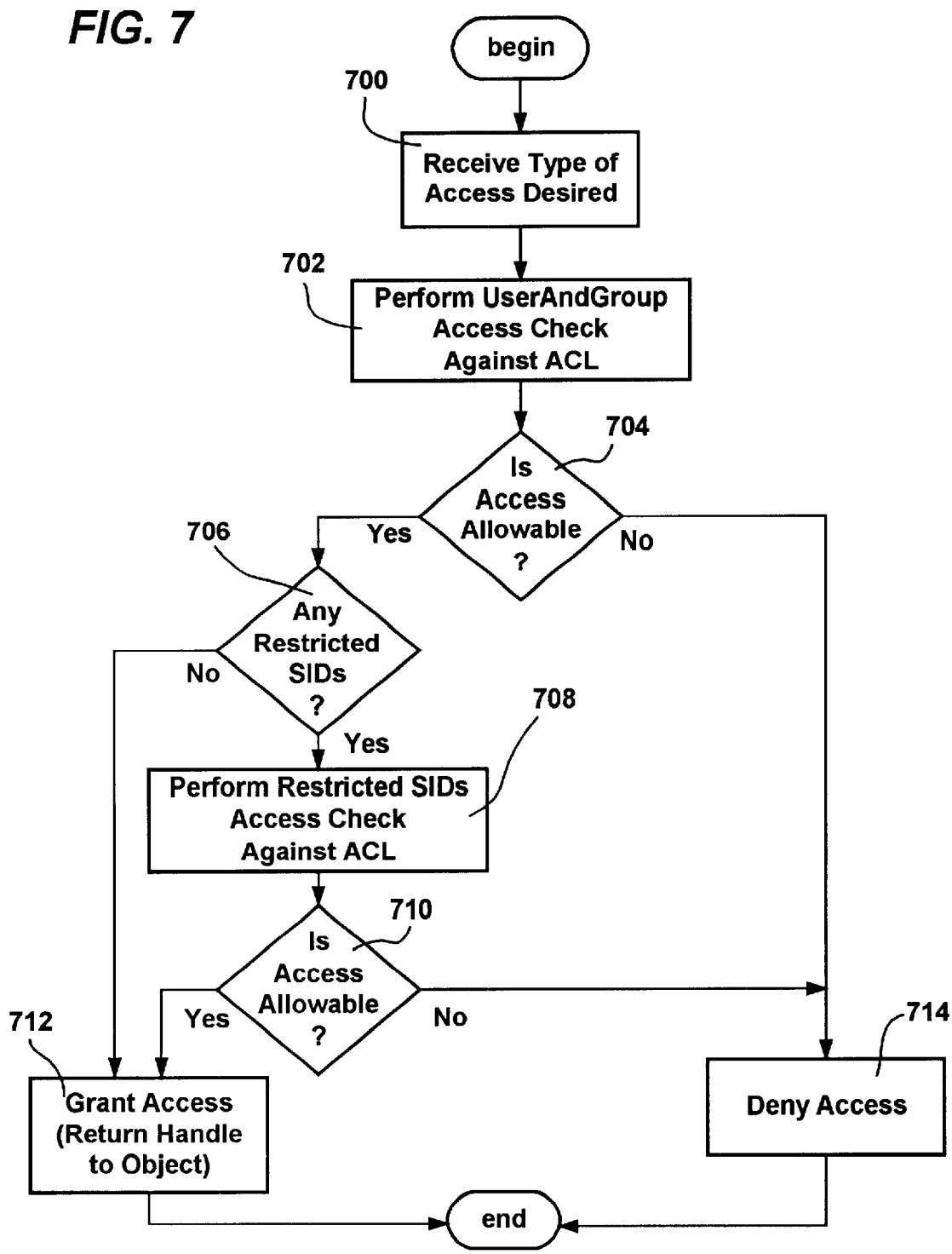
FIG. 7 is a flow diagram representing the general steps taken when determining whether to grant a process access to a resource.

Turning an explanation of the operation of restricted tokens with particular reference to FIG. 5–7, as represented in FIG. 5, a restricted process 94 has been created and is attempting to open a file object 70 with read/write access. In the security descriptor of the object 72, the ACL 80 has a number of security IDs listed therein along with the type of access allowed for each ID, wherein "RO" indicates that read only access is allowed, "WR" indicates read/write access and "SYNC" indicates that synchronization access is allowed. Note that "XJones" is specifically denied access to the object 72, even if "XJones" would otherwise be allowed access through membership in an allowed group. Moreover, the process 94 having this token 84 associated therewith will not be allowed to access any object via the "Basketball" security ID in the token 84, because this identifier is marked "DENY" (i.e., USE_FOR_DENY_ONLY).

For purposes of security, restricted security contexts are primarily implemented in the Windows NT kernel. To attempt to access the object 72, the process 94 provides the object manager 74 with information identifying the object to which access is desired along with the type of access desired, (FIG. 7, step 700). In response, as represented at step 702, the object manager 74 works in conjunction with the security mechanism 78 to compare the user and group security IDs listed in the token 84 (associated with the process 94) against the entries in the ACL 80, to determine if the desired access should be granted or denied.

As generally represented at step 704, if access is not allowed for the listed user or groups, the security check denies access at step 714. However, if the result of the user and group portion of the access check indicates allowable access at step 704, the security process branches to step 706 to determine if the restricted token 84 has any restricted security IDs. If not, there are no additional restrictions, whereby the access check is complete and access is granted at step 712 (a handle to the object is returned) based solely on user and group access. In this manner, a normal token is essentially checked as before. However, if the token includes restricted security IDs as determined by step 706, then a secondary access check is performed at step 708 by comparing the restricted security IDs against the entries in the ACL 80. If this secondary access test allows access at step 710, access to the object is granted at step 712. If not, access is denied at step 714.

As logically represented in FIG. 6, a two-part test is thus performed whenever restricted Security IDs are present in the token 84. Considering the security IDs in the token 84 and the desired access bits 96 against the security descriptor of the object 72, both the normal access test and (bitwise AND) the restricted security IDs access test must grant access in order for the process to be granted access to the object. Although not necessary to the invention, as described above, the normal access test proceeds first, and if access is denied, no further testing is necessary. Note that access may be denied either because no security ID in the token matched an identifier in the ACL, or because an ACL entry specifically denied access to the token based on a security identifier therein.

Thus, in the example shown in FIG. 5, no access to the object 72 will be granted to the process 94 because the only Restricted SID in the token 84 (field 92) identifies "Internet Explorer," while there is no counterpart restricted SID in the object's ACL 80. Although the user had the right to access the object via a process running with a normal token, the process 94 was restricted so as to only be able to access objects having an "Internet Explorer" SID (non-DENY) in their ACLs.

Note that instead of specifying a type of access, the caller may have specified MAXIMUM_ALLOWED access, whereby as described above, an algorithm walks through the ACL 80 determining the maximum access. With restricted tokens, if any type of user or group access at all is granted, the type or types of access rights allowable following the user and groups run is specified as the desired access for the second run, which checks the RestrictedSids list. In this way, a restricted token is certain to be granted less than or equal to access than the normal token.

Lastly, it should be noted that the security model of the described herein may be used in conjunction with other security models. For example, capability-based security models residing on top of an operating system may be used above the operating system-level security model of the present invention.

Jobs

A Job is a kernel object having a set of processes organized therein, wherein each job may have a different type of restriction associated therewith. In keeping with the present invention, restricted tokens may be integrated with Windows NT Job Objects to allow management of multiple processes running under the same restrictions. A Job object restriction is set forth below:

```
Typedef struct _JOBOBJECT_SECURITY_LIMIT_INFORMATION {
    ULONG SecurityLimitFlags ;
    HANDLE JobToken ;
    PTOKEN_GROUPS SidsToDisable ;
    PTOKEN_PRIVILEGES PrivilegesToDelete ;
```

```
    PTOKEN_GROUPS RestrictedSids ;
} JOBOBJECT_SECURITY_LIMIT_INFORMATION,
*PJOBOBJECT_SECURITY_LIMIT_INFORMATION ;
``` wherein the relevant SecurityLimitFlags may be:

```
#define JOB_OBJECT_SECURITY_FILTER_TOKENS   0x00000008
```

These various pieces of information can be set on a Job object using an NtSetInformationJobObject API, while a process is assigned to a job using the NtAssignProcessToJobObject API. The security limit set on the job takes effect when a process is assigned. To restrict a job, the JOB_OBJECT_SECURITY_FILTER_TOKENS limit flag is set, whereby the primary token of the process being assigned to the job is filtered using the SidsToDisable, PrivilegesToDelete and RestrictedSids information provided in the security limit information, in a similar manner to how tokens associated with processes are filtered as described above.

Figure 8:
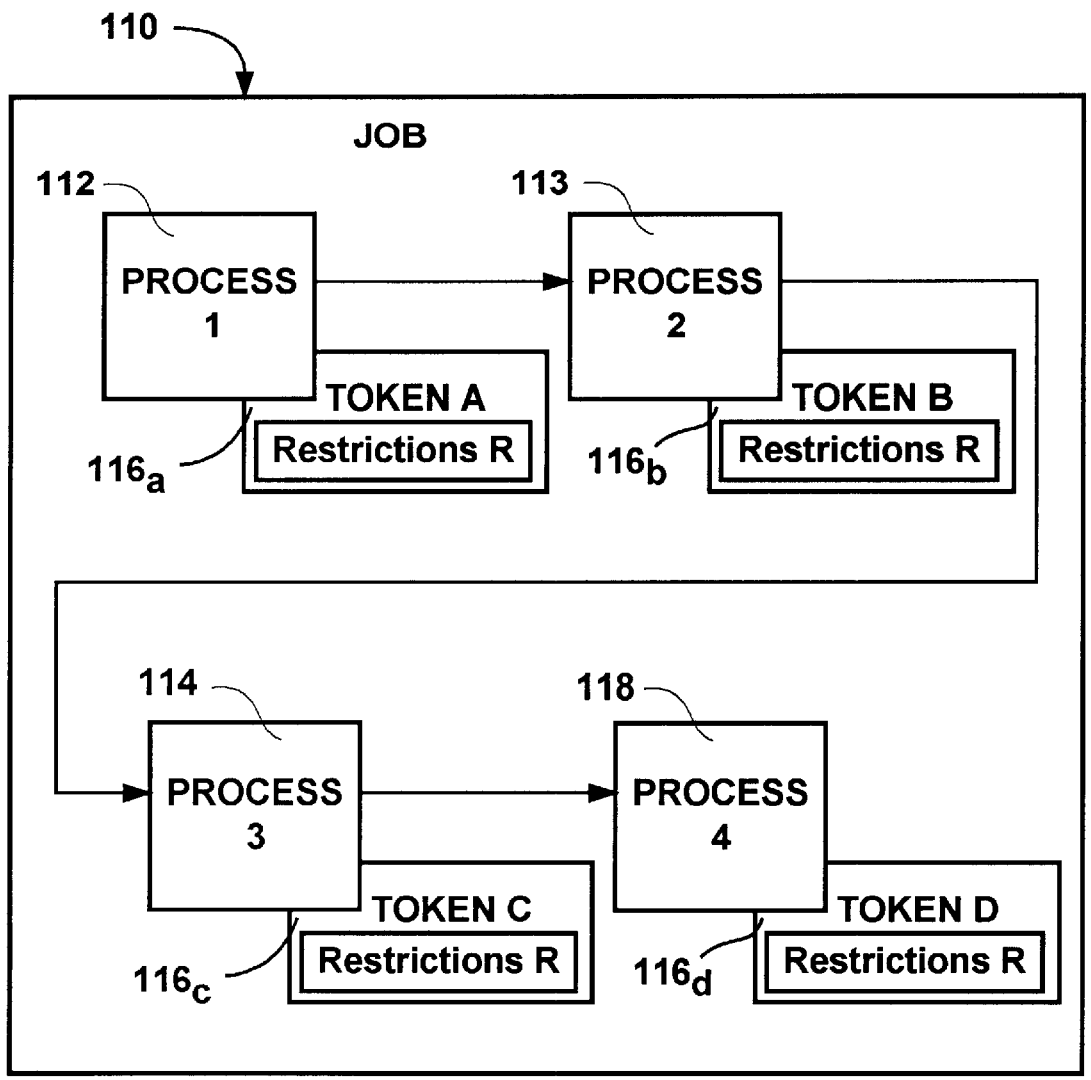
FIG. 8 is a representation of a job object having multiple processes therein having common restrictions.

As shown in FIG. 8, a job 110 has a number of processes (e.g., processes 112–114) assigned thereto via the job NtAssignProcessToJobObject API. Each process 112–114 has a respective token $116_a$–$116_c$ associated therewith that is the same with respect to its restrictions, shown as "Restrictions R." For example, the Job object 110 restricts the processes 112–114 therein to only perform certain operations, because the tokens $116_a$–$116_c$ under which they are running have certain Security IDs (e.g., Administrator SID) disabled, certain privileges removed and/or a set of restricted Security IDs added. Note that the tokens may be the same with respect to their other access rights as well, in which event all of the tokens are essentially identical, but this is not required. If a process (e.g., the process 114) produces another process 118, that process 118 also runs in the job 110 with the same restrictions R, as the job object 110 ensures that the same restrictions R are associated with the new process 118 via its token $116_d$.

Running Untrusted Content

In accordance with one aspect of the present invention, restricted tokens are used to set up restricted security contexts for running untrusted content. One type of content that is typically not trusted is content downloaded from an Internet site. To restrict such content, a restricted process may be set up for running each site that is browsed, by associating the process with (at least) a generically restricted token along with other restrictions. Note that the process may also be within a job object, whereby any processes created by the site's process are automatically given the same restrictions. Another advantage to job objects is that windowing operations may be restricted, so that, for example, a process cannot shut down the machine or access clipboard data. In any event, any actions that the site's content performs, such as via dynamic HTML, Java or Active-X controls, takes place within the process, whereby it is subject to the restrictions of the process. Note that different frames are treated as different sites, regardless of their actual site source, even though multiple frames may simultaneously be displayed in windows on the screen.

Figure 9:
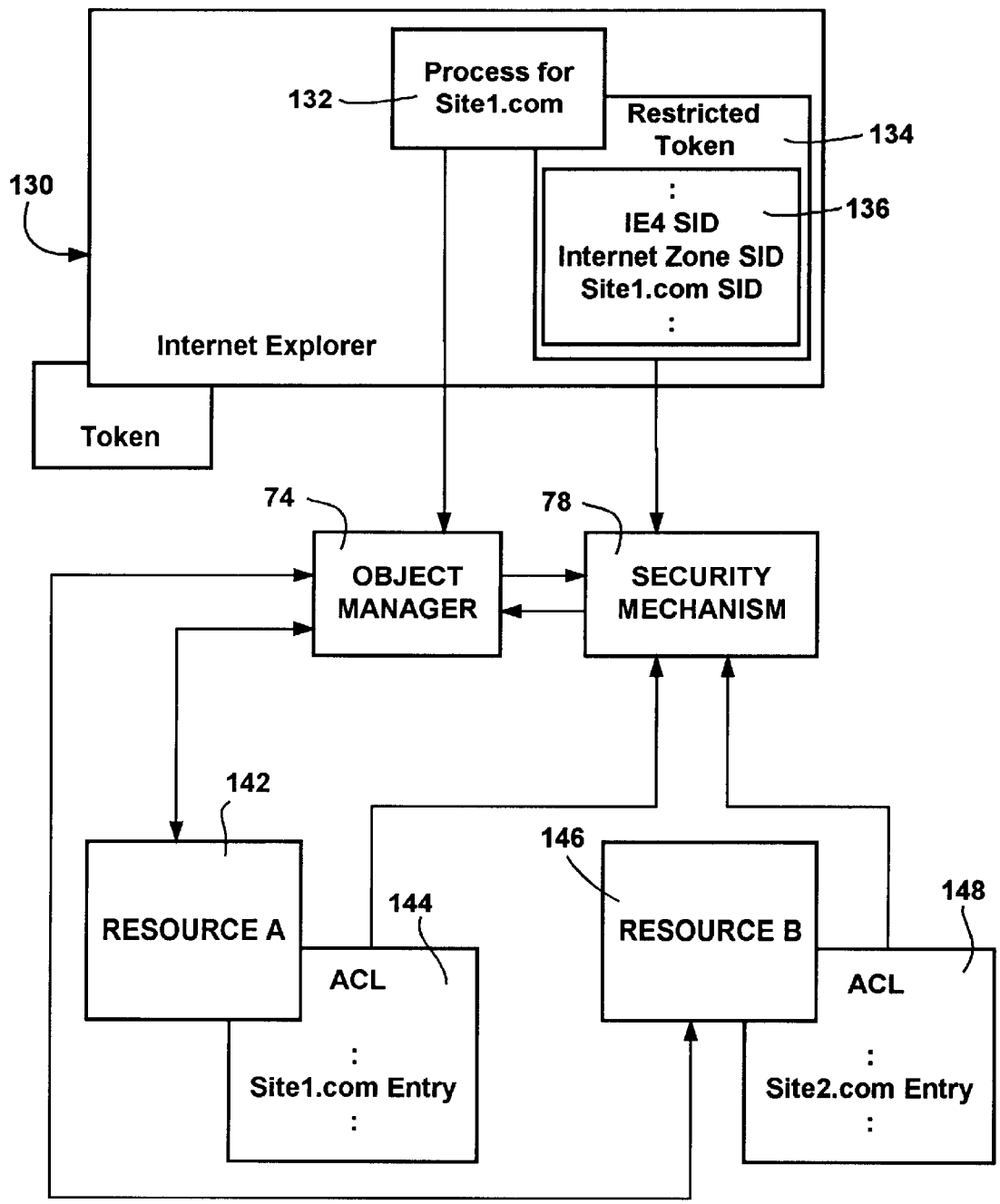
FIG. 9 is a block diagram generally representing untrusted content in a process set up therefor and restricted with respect to access to resources in accordance with one aspect of the present invention.

By way of example, as shown in FIG. 9, any content accessed via a browser 130, such as Internet Explorer, may be run in a process 132 that has a restricted token 134 including an "Internet Explorer" restricted SID in its restricted SIDs field 136. As described above, this automatically prevents access to any resource not having an allow entry corresponding to the Internet Explorer SID, (unless access is via another matching restricted SID). Thus, for example, the process 132 may render HTML pages in a window of Internet Explorer, but is restricted from doing much else unless an ACL of a resource specifically includes an entry with a corresponding restricted SID that allows the action.

Figure 10A:
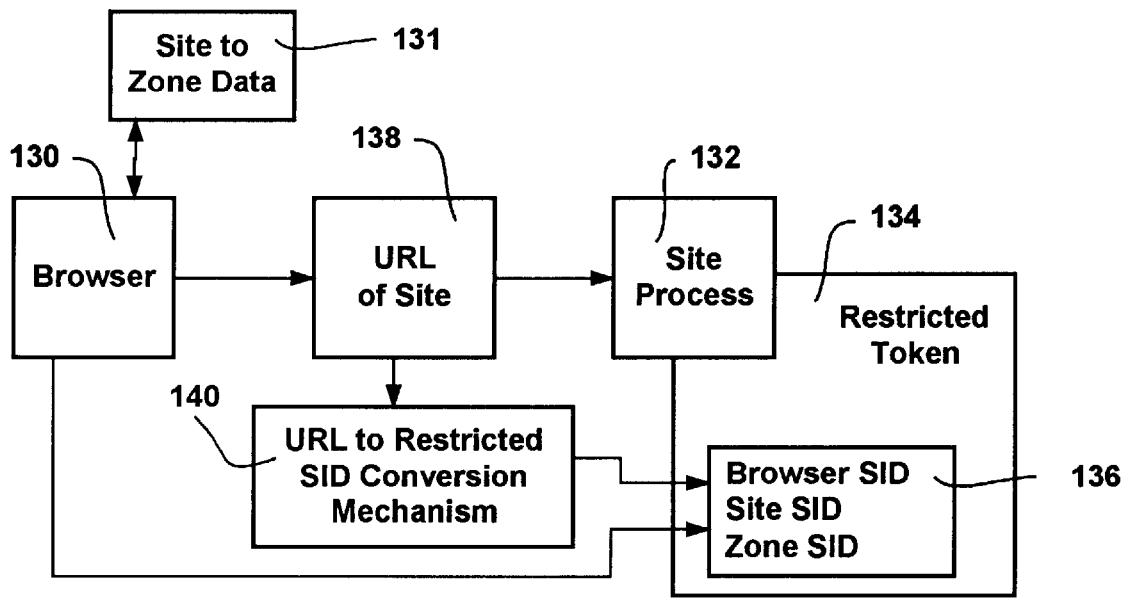
FIGS. 10A–10B are block diagrams representing components in accordance with another aspect of the present invention for restricting processes according to criteria for untrusted site and e-mail content, respectively.

Another way in which to restrict downloaded Internet content is to restrict access to resources based on the site identity. For example, each site has a unique URL (Uniform Resource Locator), and may have a binary certificate ID. To restrict based on the URL, as shown in FIG. 10A, the browser 130 acts as a discrimination mechanism that passes the site URL 138 to a converter 140 that converts the URL string into a restricted SID. One such mechanism uses a one-way cryptographic hash such as MD5 to convert the string into 128-bit binary value, which then becomes a restricted SID by adding a small amount of information such as a header or the like thereto indicating that the number is a SID and how the number was generated. Such a SID is, to an extremely high probability, unique with respect to other SIDs. Note that if a binary certificate ID is available for the site, then that value may be used to generate the restricted SID. In any event, as shown in FIG. 9, the restricted SID is placed in the restricted SIDs field 136 of the restricted token 134 associated with the process 132 set up for that site.

Further, the restriction may be based on Internet zones (a collection of sites). For example, as also shown in FIG. 10A, user may set up a zone comprising a list of specifically trusted sites, and another for specifically untrusted. The trusted zone will correspond to one restricted SID while the untrusted zone will correspond to another. Zones may also be set up to distinguish between Intranet sites and Internet sites. A further distinction may be made for Internet sites having one type of certificate and so on, to any desired granularity wherein a distinction may be made. In any event, the browser 130 has access to information 131 that groups sites into zones, whereby a restricted SID may be generated that corresponds to the site's zone, and placed in the restricted token 136 to identify the zone to system resources for ACL-based security checking.

As described above, once a restricted SID is present in a token, the security mechanism 78 performs an access evaluation with a user and group check followed by (if the user and group test is passed) a check of the restricted SIDs. As a result, the ACL for each resource determines how untrusted code is handled by the presence or absence of corresponding entries therein. For example, a file object may allow read access to a specifically trusted site or zone, but not any other type of access or any access whatsoever to any other site or zone. A highly confidential file may specifically deny access to any restricted token having the "Internet Explorer" SID therein so as to prevent any access via some other restricted SID. Thus, for example, as shown in FIG. 9, the Resource A (142) allows read access to the process 132 because its ACL 144 contains a "Site1.com" entry corresponding to the "Site1.com" restricted SID in the restricted token 134 of the process 132. However, Resource B (146) will not allow access because no corresponding entry is present. While the above mechanism functions to restrict access, certain difficulties arise in that resources may lack the granularity to discriminate based on the various distinctions such as sites or zones. For example, the process set up for a particular Internet site may need to access that site. However, the driver that handles Windows sockets (the AFD device driver) has its ACL set up to either allow or deny networking, but cannot practically distinguish between each site or zone. To deny networking altogether prevents a process from accessing its own corresponding site, yet allowing a process to access any site allows the process access to other sites, which can potentially divulge confidential information about a client. Reasons to restrict network access include preventing access to unsecured files on file servers not normally accessible from the Internet, preventing access to unsecured internal databases, preventing attacks on network resources (for example via bad packets or DHCP responses) and preventing information leaks about other possible ways to reach the network.

Figure 11:
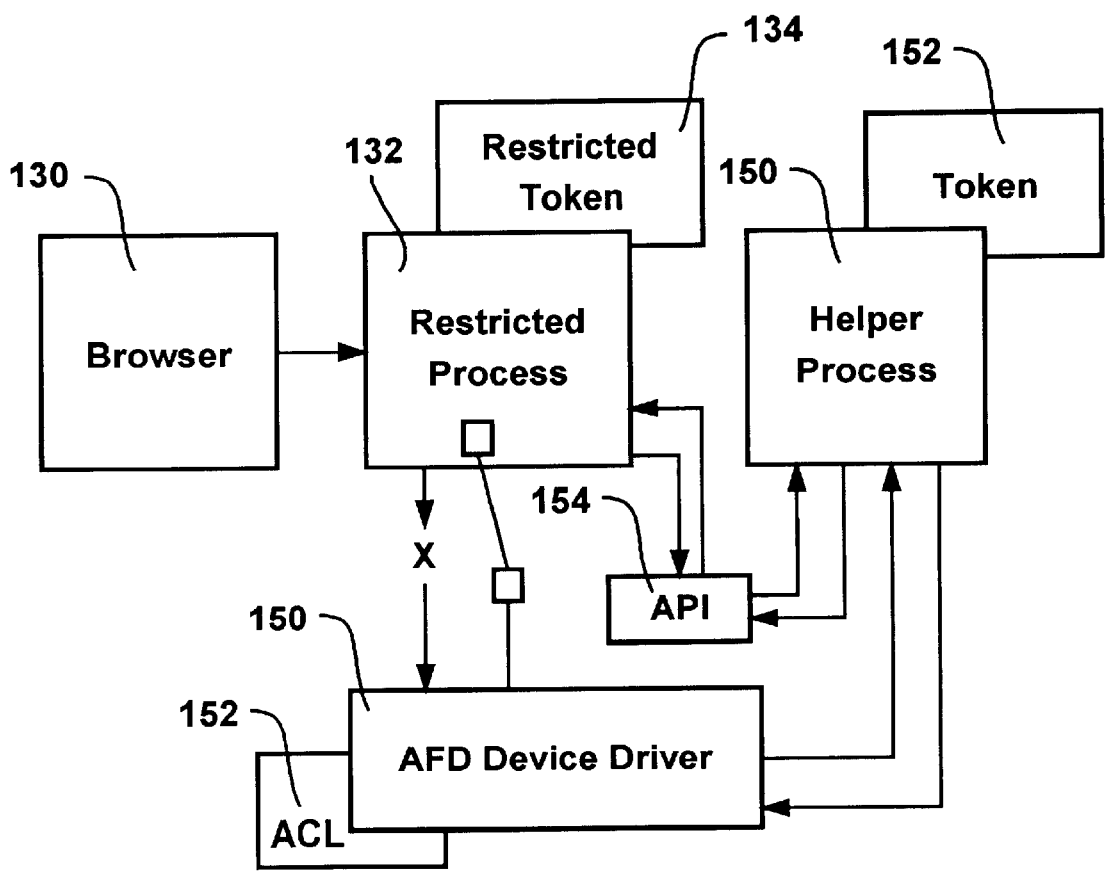
FIG. 11 is a block diagram generally representing a helper process for accessing a resource on behalf of a restricted process in accordance with another aspect of the present invention.

To resolve this dilemma by selectively restricting a process to certain sites, the present invention generally restricts the process from networking, but employs a trusted helper process that can perform networking for the site. The helper process restricts the process to an extent that allows the restricted process to access only selected sites (e.g., all sites ending in "Microsoft.com") as determined by the helper process. More particularly, as shown in FIG. 11, the restricted process 132 is denied direct access to the windows sockets AFD driver 150, (as represented by the "X"), whereby the restricted process 132 cannot directly get the socket handle for any site, including its own. Note that by denying access to restricted processes via the ACL 152 of the device driver 150, the device driver 150 may not be accessed by the restricted process 132 via some other manner, such as by directly calling into the kernel. However, a helper process 154, which is trusted, has access to the driver 150 via its own non-restricted token 156 and can retrieve a socket handle. By modifying the Winsock connect( ) API 158 to invoke the helper process 154 whenever a restricted process 132 attempts to retrieve a socket handle, the handle to one of a site's verified or allowed sockets is returned when the appropriate mechanism (i.e., the API 158) is used.

Figure 12A:
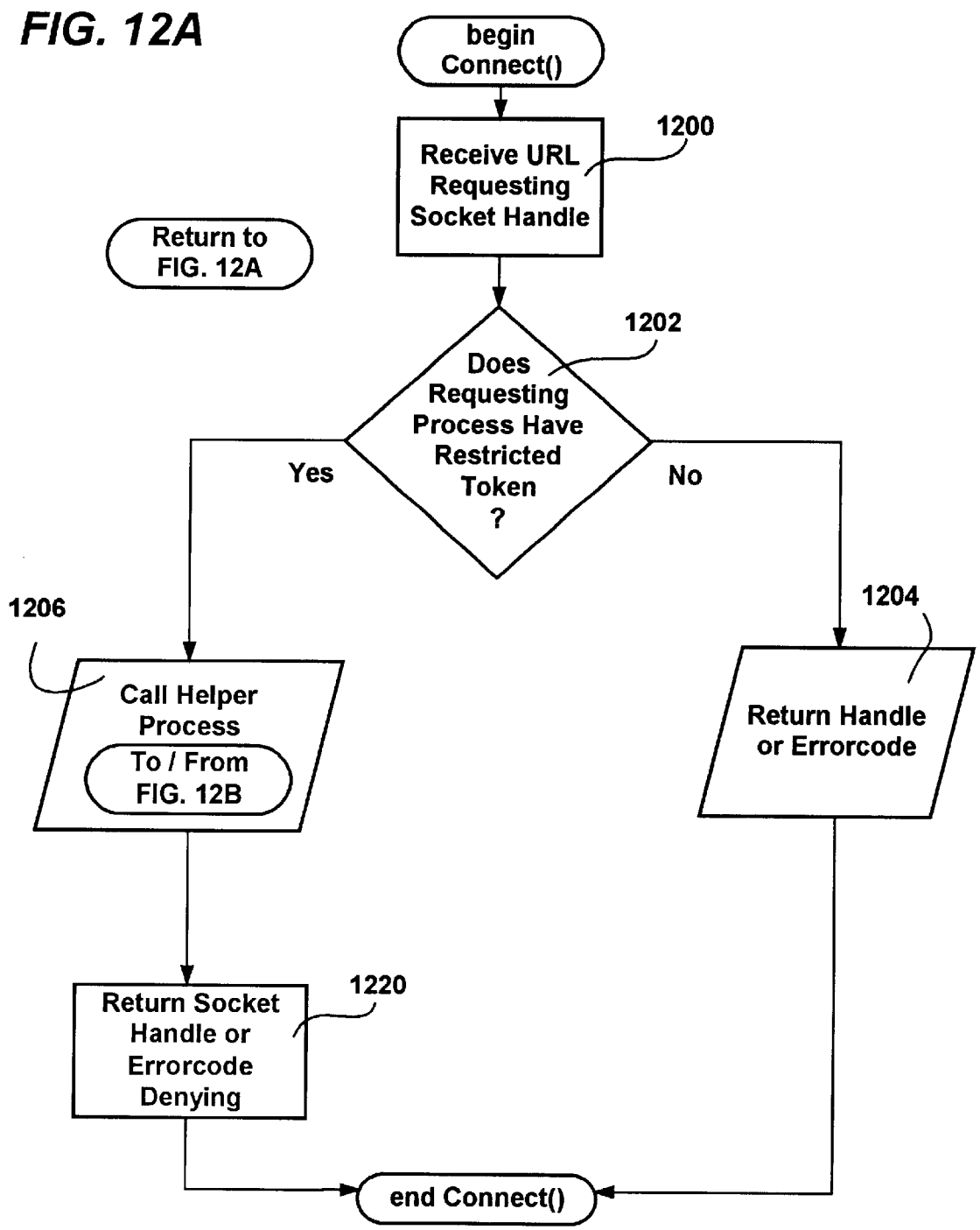
FIGS. 12A and 12B comprise a flow diagram showing how an application programming interface (API) uses a helper process to return information from a resource to a process that is restricted from accessing the resource in accordance with another aspect of the present invention.

More particularly, as shown in FIG. 12A, when the Winsock socket( ) and connect( ) API 158 is called at step 1200 to return a handle to a socket, the connect( ) API 158 first checks at step 1202 to see if the calling process 132 is restricted via an appropriate restricted SID in its token 134. If not restricted, step 1202 branches to step 1204, wherein the connect( ) API 158 operates as before to return a socket handle or an appropriate errorcode (e.g., no socket available, host unreachable, access denied and so on).

Figure 12B:
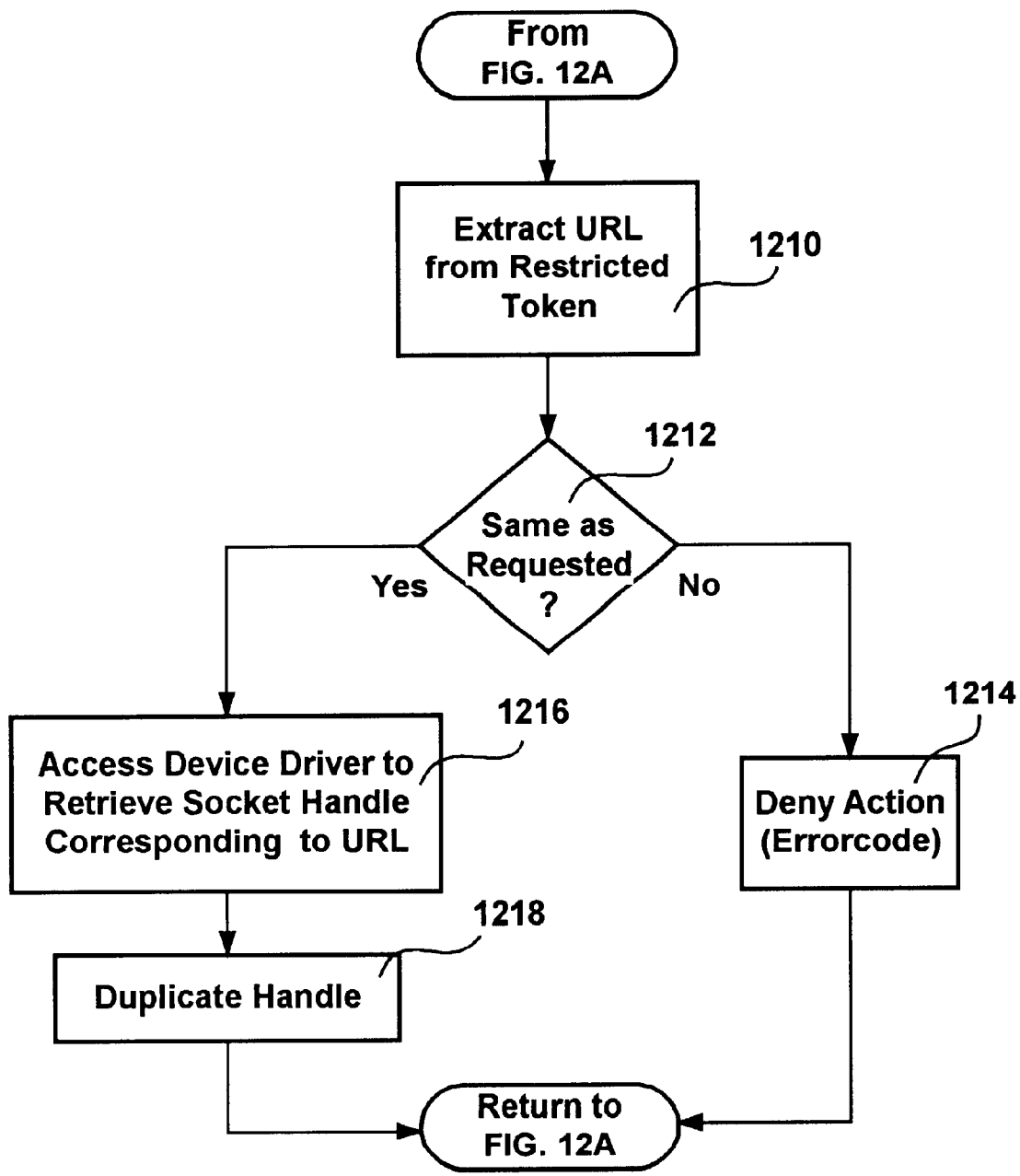

However, when a restricted process 132 makes the connect( ) call as determined by step 1202, the connect( ) API 158 calls the helper process 154 (FIGS. 11 and 12B) at step 1206. As represented by step 1210 of FIG. 12B, the helper process 154 extracts the site information of the site from the restricted token 134, and at step 1212, compares the site's allowed (or denied) addresses with the requested address. If they are not allowed, step 1212 branches to step 1214 wherein the socket request is effectively denied such as by setting an appropriate errorcode. If they are the same, step 1212 branches to step 1216, wherein the helper process 154 accesses the device driver 150 to obtain the socket handle to the site corresponding to the process 132 (assuming a handle is available and that there are no other errors). The helper process 154 (FIG. 12B) duplicates the handle at step 1218, then returns to the connect( ) API 158 (FIG. 12A) with either the duplicated handle or some indication of an error, after which the connect( ) API 158 returns the socket handle or an errorcode to the restricted process 132 at step 1220. In this manner, if a handle is returned, the restricted process 132 may thereafter access the verified/allowed site via the handle, but no other sites. Note that the helper process 154 is trusted, and is carefully written to allow only that site's socket handle.

Similarly, the Wininet.dll which (among other functions) downloads URL-identified data at the file level employs a helper process when a restricted process downloads a file. The helper process extracts and validates the URL that a site is requesting, and if validated, does the downloading and other Wininet work while providing notifications to the restricted process. As can be readily appreciated, allowing the helper process to set the ACLs on downloaded files secures those files from other sites. Again, when a restricted process calls the wininet-related API, the API invokes the appropriate helper process.

Figure 13:
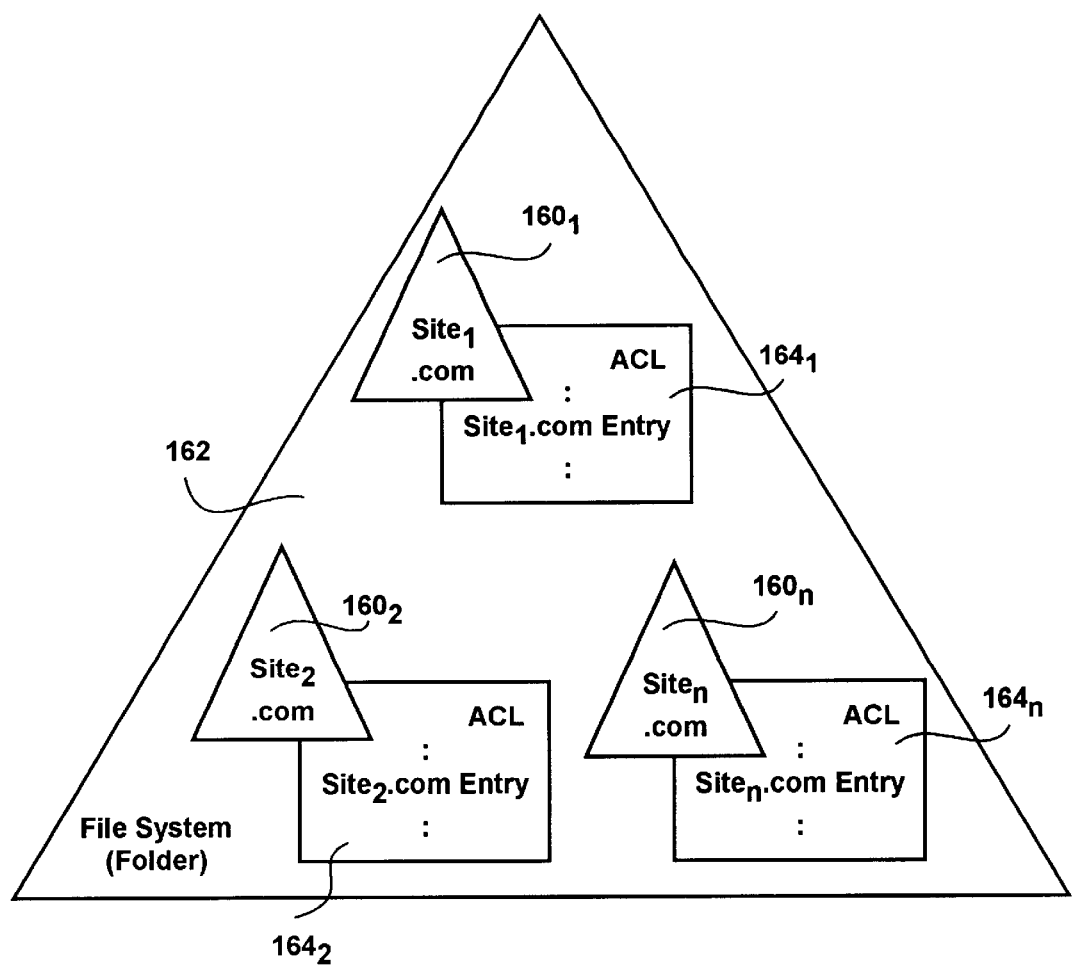
FIG. 13 is a representation of a site's files isolated from the files of other sites in a file system in accordance with another aspect of the present invention.

In addition to restricted access to other sites, a restricted process set up for a site is restricted from accessing files other than its own. To this end, any file created by a site on the user's system is placed in a folder that has an ACL entry specifically corresponding to that site. For example, as shown in FIG. 13, (wherein folders are represented as triangles to indicate the hierarchical folder structure), each site (Site$_1$.com to Site$_n$.com) has its own subfolder 160$_1$–160$_n$ in the file system, such as under an Internet site file folder 162. Since only the process of that site (e.g., Site1.com) will have a restricted SID in its token that corresponds to the entry in its ACL 164$_1$, no other site (e.g., Site2.com) will be able to access its files, and vice-versa. Such isolation enables sites to access (e.g., create, open, read, write and delete) its own files, but prevents content from another site from accessing those files.

Figure 14:
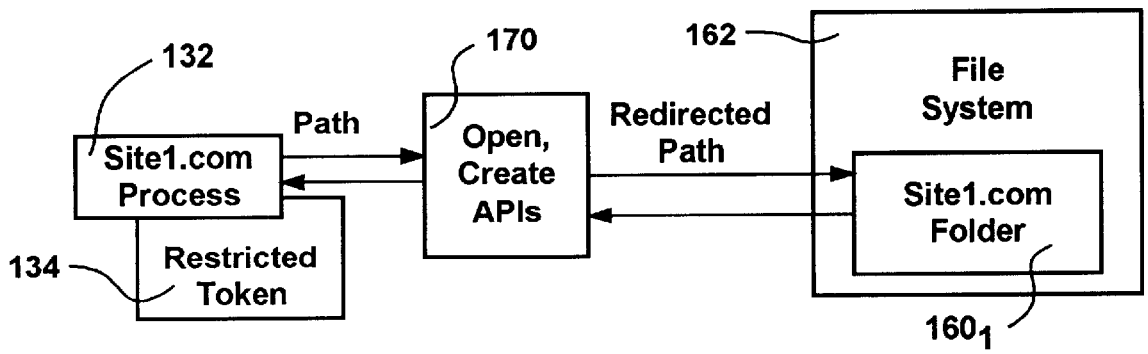
FIGS. 14 and 15 are a block diagrams representing how untrusted content's file system and registry requests, respectively, are redirected in accordance with another aspect of the present invention.

AS shown in FIG. 14, the mechanism for accomplishing isolation of files based on a site may be built into the APIs 170 for opening and creating files. The APIS for creating and opening files are set up to recognize (by examining the restricted SIDs in the restricted token 134) when a process 132 set up for an Internet site is calling, and adjust the path to appropriately place and/or locate each file based on the restricted token 134. Note that since other file operations (e.g., read, write and delete) use the file handle returned by these APIs, the other APIs need not be modified for path redirection.

Figure 15:
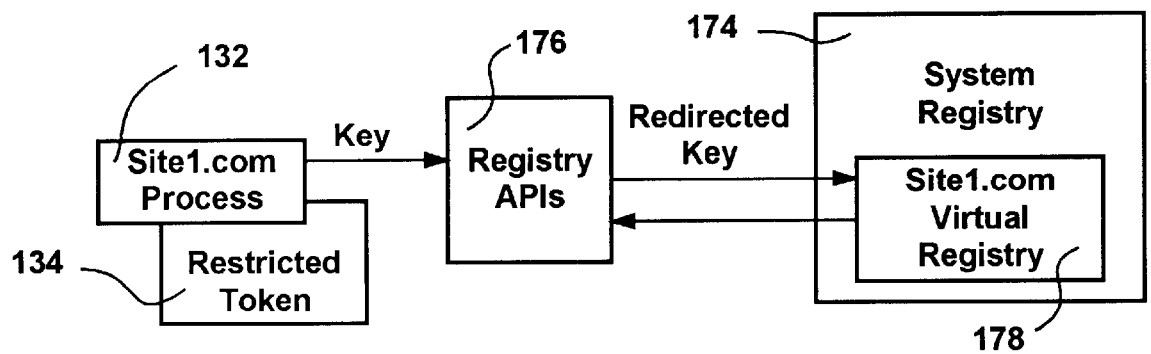

Similarly, as shown in FIG. 15, a restricted process 132 may only indirectly access the system registry 174, but in accordance with the invention, only via a virtualized view of the registry, e.g., under its own site-based key name (regardless of the key name provided by the process). For example, a site may include an Active-X control that tries to write to the system registry 174. To provide a virtualized view of the registry for a restricted process, the registry WIN32 APIs 176 for accessing the registry (e.g., the RegSaveKey( ) and RegRestoreKey( ) APIs) redirect restricted processes to and from their site-specific subtree 178 in the registry (or copy thereof). In this way, the untrusted content believes it is able to register information in the registry 174 at the specified location, but actually is restricted to accessing a subtree or virtual registry 178, thereby effectively isolating the existing registry information.

Figure 10B:
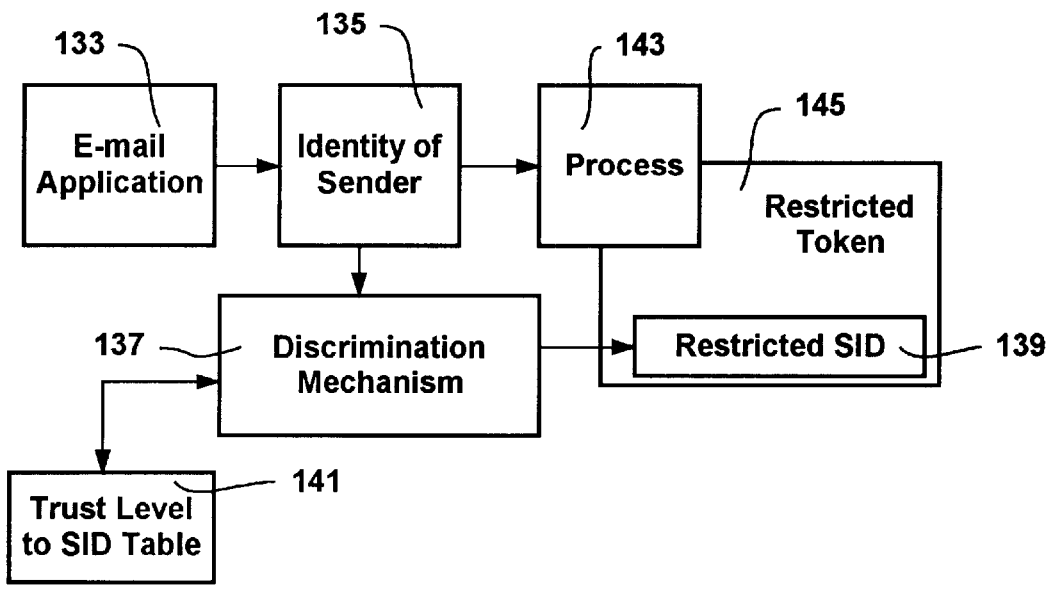

Another way in which untrusted content may be downloaded to a machine is via electronic mail (e-mail). With e-mail, the level of trust depends on who sent the message, and, if there are any attachments, the type (and if known, the origin) of the attachments. FIG. 10B shows exemplary components for determining trust based on the identity of the sender, wherein a mail application 133 passes the identity 135 to a discrimination mechanism 137. The discrimination mechanism 137 determines a trust level of the user in order to convert the user identity (and other criteria such as some authentication verifying that the identity is true) to a restricted SID 139, such as by looking up the restricted SID 139 in a trust level to SID table 141 or the like. The process 143 in which the mail content is run is associated with a restricted token 145 that includes the restricted SID 139.

Figure 16:
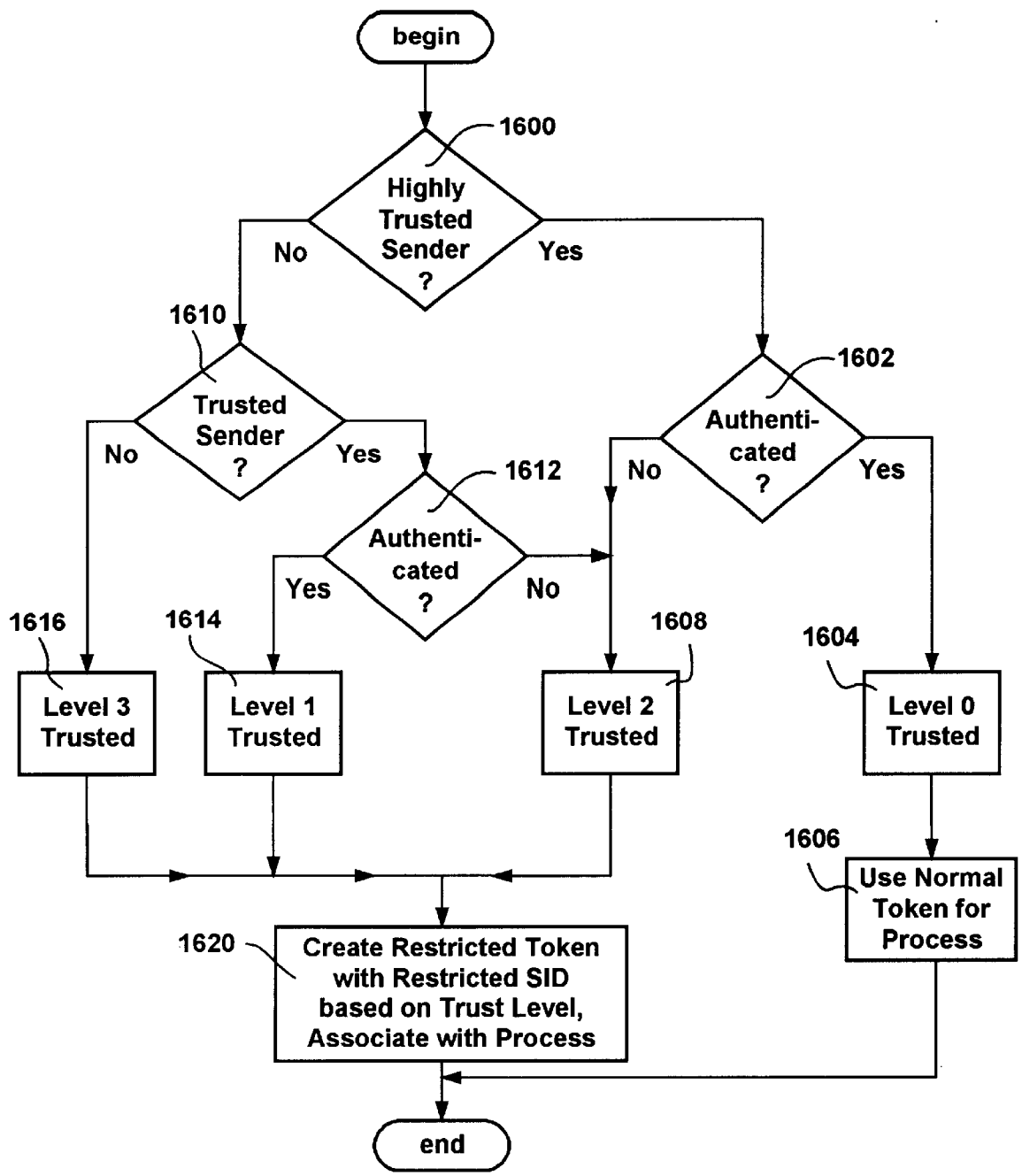
FIG. 16 is a flow diagram representing an example of how e-mail content may be restricted according to criteria including the identity of the sender, in accordance with another aspect of the present invention.

FIG. 16 represents the general logic used by the discrimination mechanism 137 for an exemplary way to restrict access based on the sender of an e-mail message. Note that the "From" field of the message is used to determine the purported identity of the sender, while an authentication mechanism (e.g., within the e-mail application 133) such as via a digital signature may be used to verify that the sender is indeed the source of the message. It should further be noted that source-based restrictions may be similarly set up for on-line news, whereby the downloaded news content runs in a restricted context based on the identity of the sender.

By way of example, consider the following simplified policy that may be set up on a machine, wherein an e-mail message sender is either highly trusted, trusted or untrusted, and the sender may or may not be authenticated. For example, an individual's supervisor and immediate co-workers may be highly trusted senders, employees and close friends trusted senders, and all others untrusted. On the machine, the resource ACLs are set up with entries corresponding to restricted SIDs such that a process with a restricted token having a restricted SID indicating a trust level of one is able to read and write files, while a trust level two process may only read files. A process with a restricted token having a restricted SID indicating a trust level of three is denied access to any resources. A trust level of zero means that the normal (non-restricted) token will be associated with the process.

As shown in FIG. 16 at step 1600, if the user is highly trusted (e.g., by comparing the name in the "From" field with a list of names), then step 1602 is executed to determine if the sender is authenticated. For example, the message may be digitally signed such that the recipient is assured of the true identity of the sender. If authenticated, then step 1604 sets the trust level to zero and step 1606 associates the normal token with the process set up for the message. If not authenticated, step 1608 sets the trust level to two, after which step 1620 creates a restricted token for the process that set up for the message based on the trust level of two and associates the restricted token with the process set up for the message. Note that the restricted SIDs for trust levels of one, two and three are predetermined and are stored on the machine such as in the table 141 or the like.

If the user is not highly trusted then step 1600 branches to step 1610 to determine if the user is trusted or untrusted. In accordance with the security policy, if trusted, step 1610 branches to step 1612 to determine if the sender is authenticated. If so, the message process is set up so as to be level one trusted (read and write access) at steps 1614 and 1620. If not authenticated at step 1612, then the trust level is set to two (read only) at step 1608 and the process restricted accordingly at step 1620, again by looking up and inserting the appropriate restricted SID into the restricted token. Lastly, if the user is untrusted, step 1610 branches to step 1616 wherein the trust level is set to three and at step 1620 the process is correspondingly restricted so as to be denied access to the system resources. Note that the above security policy suggests implementation via a point system, i.e., accumulate various points depending on the sender identity and various points if authenticated, and determine an access level based on the total points.

As can be readily appreciated, a similar policy may be set up to restrict attachments. However, in addition to restricting based on the sender of an attachment, the attachment may be checked for its type. For example, executable files (*.exe, *.bat, *.com and so on) files may be differentiated from text only documents, which in turn are treated differently with respect to restrictions than Microsoft Word and Microsoft Excel documents (which may contain viruses or other unruly code via macros). Indeed, any number of criteria may be employed and/or combined with other criteria to set up restricted security contexts according to a desired security policy.

Turning to a consideration of untrusted content on web servers, client processes, scripts and other such helper programs may be limited via restricted execution contexts as to what such content can do. In accordance with another aspect of the present invention, a first way for a web server to use contexts is to launch all such content in restricted contexts that prevent them from harming any core operating system data and from interfering with the data of other helper programs. As described above, this may be accomplished by setting up a process associated with an appropriately restricted token for each piece of untrusted content, thereby denying access to system data files via their ACLs and isolating any files of the untrusted content as desired. Note that memory protection is already present via process boundaries.

Figure 17:
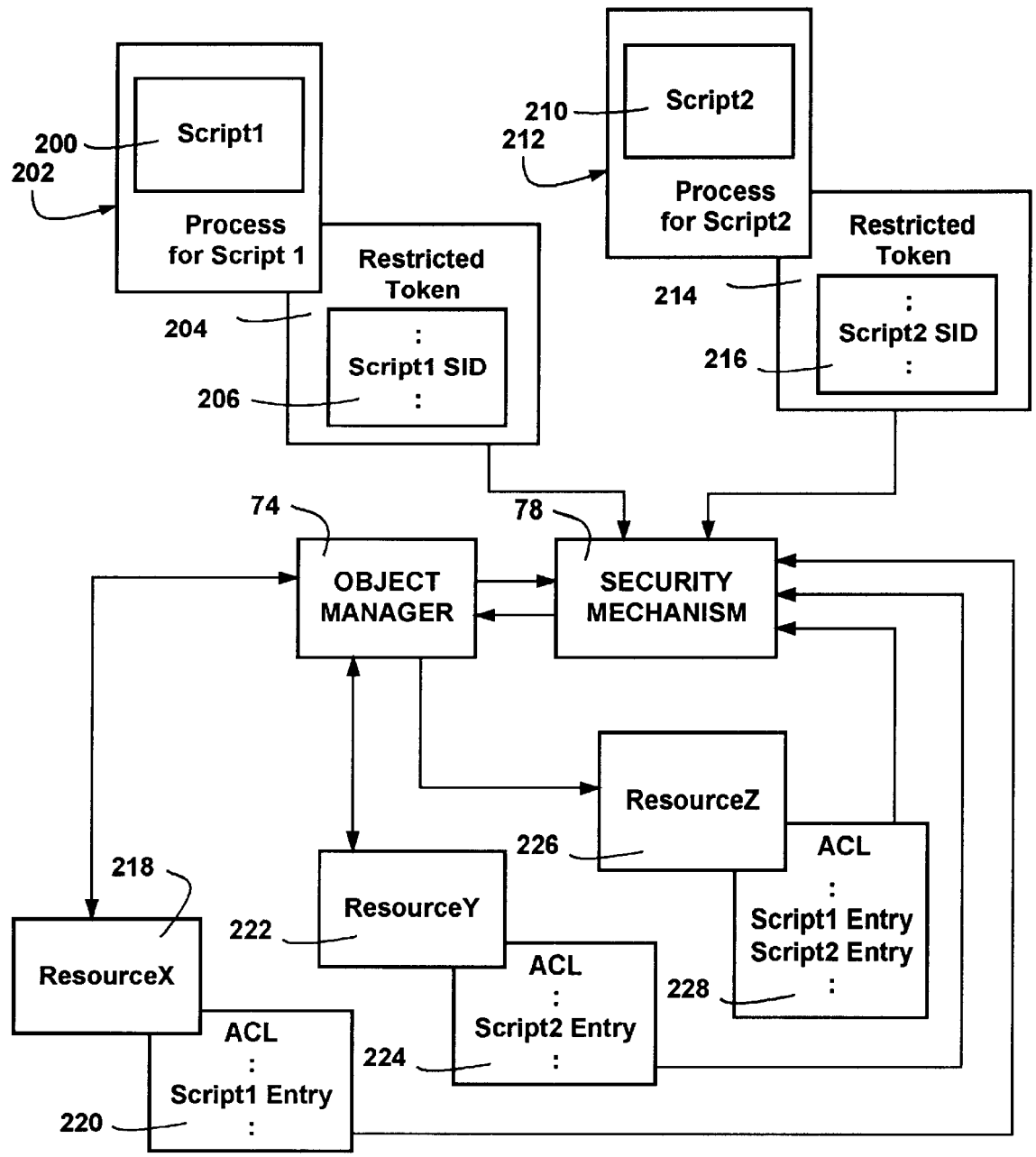
FIG. 17 is a block diagram generally representing untrusted scripts in a processes set up therefor and restricted with respect to their access to resources in accordance with another aspect of the present invention.

Moreover, restrictions may be based on the server script being run, such as by discriminating according to the author of the script and/or determining whether the script needs access to any files or needs to share files with other users or system files. For example, as shown in FIG. 17, by running a web server helper script 200 in a process 202 that is restricted by creating a restricted token 204 including a restricted SID 206 especially therefor, a script may be limited to only those resources it needs and no others, effectively limiting it from doing anything other than that for which it is intended. Thus, as shown in FIG. 17, the Script1 200 may access the ResourceX (218) and the ResourceZ (226) because each of their respective ACLs 220, 228 includes a "Script1" entry. Similarly, the Script2 210 may access the ResourceY (222) and the ResourceZ (226) because each of their respective ACLs 224, 228 includes a "Script2" entry. Thus, if the resources shown are data files, Script1 cannot interfere with the data of Script2 and vice-versa, except possibly in resourceZ, however ResourceZ is designed to be a shared file. For example, via its ACL entries, the resource Z (226) may be a read only data file with respect to these processes 202, 212, whereby both scripts 200, 210 may use the file's information but not change it.

Another option provided by the present invention is to create a Job object, which as described above, is a kernel-level object that contains the restrictions for all processes therein. Moreover, a job object may contain other limitations such as how much of a CPU's processing may be consumed. As described above, any process added to that job receives the same restrictions, whereby the web server can create processes on the client's behalf and then add the process to an existing job. The restrictions are then automatically applied to the process.

Figure 18:
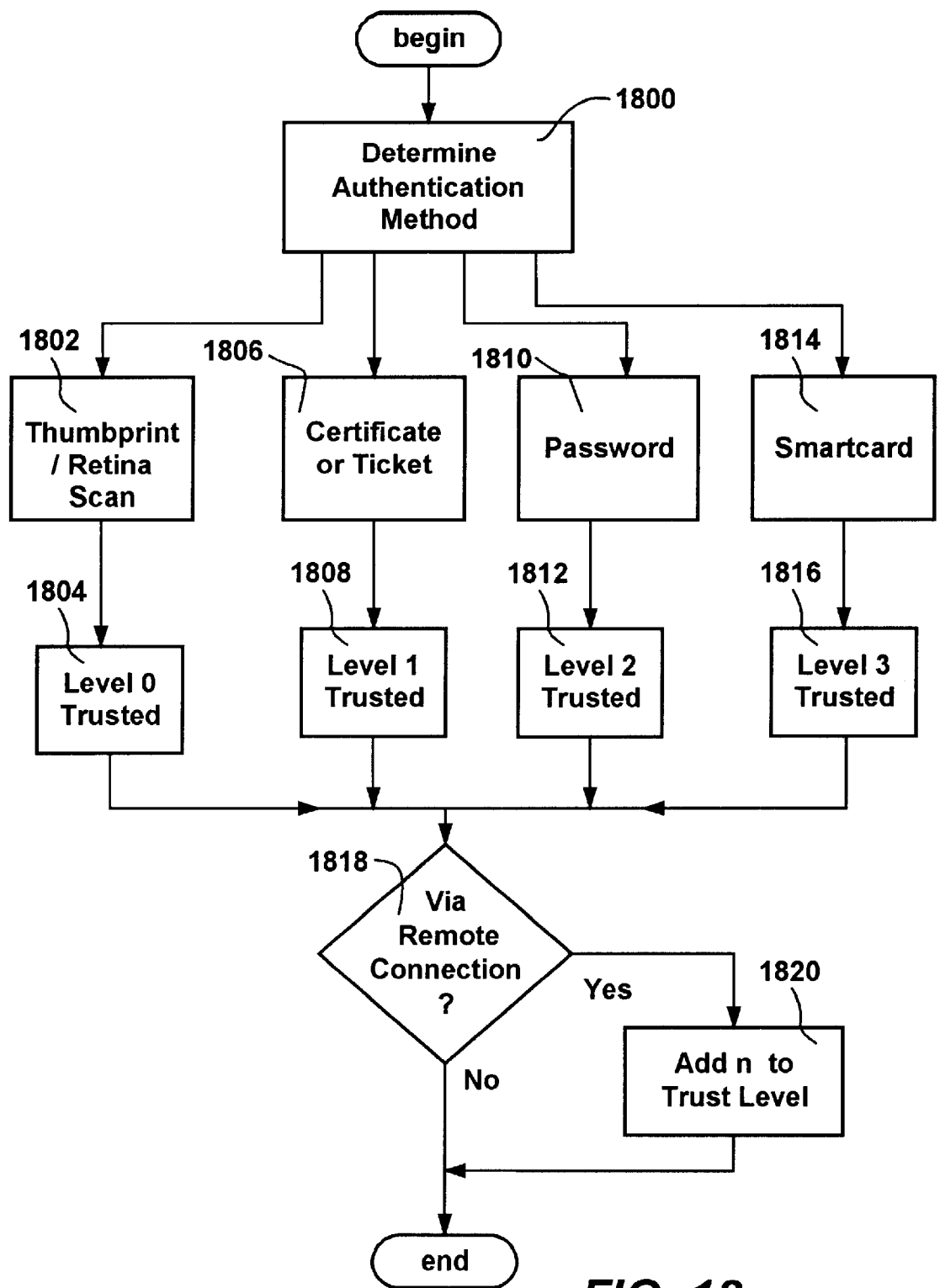
FIG. 18 is a flow diagram representing an example of how client processes may be restricted on a server according to criteria, including how the client was authenticated, in accordance with another aspect of the present invention.

In keeping with the present invention, the web server may further choose what restrictions to apply to client processes and the like based on any number of criteria, including the identity of the client (e.g., are they a company employee or not), the method of authentication used by the client (e.g., by presenting a password, a certificate, using a smartcard, or even a thumbprint/retina scan), and also the client's location (e.g., based on whether the client is on the same network, dialing in, or connecting over the Internet). FIG. 18 shows an exemplary flow diagram showing the logic for setting up trust levels depending on the type of authentication, and depending on whether the authentication took place via some remote (and thus theoretically less secure) connection, as opposed to via the local machine. For purposes of simplicity, the individual steps and logic of FIG. 18 will not be described in detail, since trust levels and their use in retrieving corresponding restricted SIDs to set up restricted tokens are similarly described above. Note, however, that in general, the more trusted the authentication, the lower the assigned trust level (which herein corresponds to increased access rights).

Lastly, an Internet Service Provider can use restricted execution contexts to safely host multiple web sites on a single web server. To this end, each web site runs in a separate restricted execution context composed of a job object and a restricted token. The job object provides quotas, so that a portion of the web server's resources is allocated to each web site. The restricted token provides isolation between the web sites, protecting private data such as customer lists, from unauthorized access.

As can be seen from the foregoing detailed description, restricted execution contexts of the present invention restrict the access of untrusted content to system resources. Restrictions may be applied on a resource-by-resource basis, dependent on any criteria available to the system.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system having an operating system provided security mechanism that determines access of processes to resources based on information in an access token associated with each of the processes against security information associated with each of the resources, a method of restricting access of content to resources, comprising, setting up a process for the content, determining restriction information based on criteria available to the computer system, automatically creating a restricted access token based on the restriction information, the restricted access token having reduced access relative to a parent token, associating the restricted access token with the process, and in response to a request for access by the process to the resource, the security mechanism determining access by evaluating data in the restricted access token against separately maintained security information currently associated with the resource.

2. The method of claim 1 wherein the content comprises data obtained from an untrusted source.

3. The method of claim 2 wherein the untrusted source comprises a computer-readable medium.

4. The method of claim 2 wherein the content writes a file to the system, and further comprising generating a restricted security identifier based on a site identity, adding the security identifier to security information of the file, and storing the file in the system.

5. The method of claim 2 wherein the content writes a file to the system, and further comprising redirecting a path provided by the content to a path associated with a site.

6. The method of claim 2 wherein the data comprises network data and the untrusted source is a network site.

7. The method of claim 6 wherein the site is an Internet site, and determining restriction information includes generating a security identifier from unique information of the Internet site.

8. The method of claim 7 wherein the unique information comprises a binary certificate identifier of the Internet site.

9. The method of claim 7 wherein the unique information comprises a Uniform Resource Locator (URL) of the Internet site, and wherein generating a security identifier includes converting the URL to the restricted security identifier.

10. The method of claim 9 wherein converting the URL to the restricted security identifier includes hashing the URL with a cryptographic hash function.

11. The method of claim 1 wherein the content comprises an electronic mail message.

12. The method of claim 11 wherein determining restriction information includes determining the sender of the message.

13. The method of claim 12 wherein determining the sender of the message includes authenticating the sender.

14. The method of claim 1 wherein the content comprises a script.

15. The method of claim 14 wherein the system is a server, and wherein determining restriction information includes determining how a client was authenticated to the server.

16. The method of claim 1 wherein the content comprises data downloaded from a site, further comprising determining a zone corresponding to the site, and wherein creating the restricted access token includes adding a restricted security identifier corresponding to the zone to the restricted access token.

17. The method of claim 1 wherein the resource is unavailable for direct access by the restricted process, and further comprising, accessing the resource through a helper process associated with the restricted process.

18. The method of claim 17 wherein the helper process extracts information associated with the content from the restricted token.

19. The method of claim 17 further comprising detecting at an application programming interface an attempt to access a resource from the process having the restricted token as its access token, and in response, calling the helper process to access the resource, and returning information from the helper process to the process having the restricted token as its access token.

20. The method of claim 17 further comprising setting the security information of the resource to allow access to the helper process and deny access to the process having the restricted token as its access token.

21. The method of claim 17 wherein accessing the resource unavailable to the restricted process through a helper process includes communicating with the resource through the helper process.

22. The method of claim 17 wherein accessing the resource unavailable to the restricted process through a helper process includes requesting the helper process to make the resource available.

23. The method of claim 1 further comprising putting the process into a job object.

24. The method of claim 1 wherein the content attempts to access a system registry, and further comprising redirecting a registry location provided by the content to a registry location associated with the content.

25. A computer-readable medium having computer-executable instructions for performing the method of claim 1.

26. In a computer system, a system for restricting access of content to resources, comprising, a process set up for the content, a discrimination mechanism configured with executable code to determine restriction data based on information corresponding to the content, a mechanism configured with executable code to automatically create a restricted access token for the process based on the restriction data, the restricted access token having reduced access relative to a parent token, and a security mechanism configured with executable code to determine access of the content's process to a resource by comparing information in the restricted access token to separately maintained security information currently associated with the resource.

27. The system of claim 26 wherein the content comprises data downloaded from a site.

28. The system of claim 27 wherein the site is an Internet site, and wherein the discrimination mechanism generates a restricted security identifier from information of the Internet site.

29. The system of claim 28 wherein the information of the Internet site comprises a binary certificate identifier of the Internet site.

30. The system of claim 28 wherein the information of the Internet site comprises a Uniform Resource Locator (URL), and further comprising a converter for converting the URL to the restricted security identifier.

31. The system of claim 30 wherein the converter includes a one-way cryptographic hash function.

32. The system of claim 26 wherein the content comprises an electronic mail message.

33. The system of claim 32 wherein the discrimination mechanism determines a restricted security identifier based on the sender of the message.

34. The system of claim 26 wherein the content comprises a script.

35. The system of claim 26 wherein the computer system comprises a server, and wherein a restricted security identifier is generated for a client connected to the server according to how the client was authenticated to connect to the server.

36. The system of claim 26 further comprising a helper process for extracting information associated with the content from the restricted access token and for accessing the resource on behalf of the process.

37. The system of claim 26 further comprising a job object, wherein the process runs in the job object.

38. The method of claim 26 wherein the restriction data corresponds to at least one restricted security identifier to add to the restricted access token relative to a parent access token.

39. The method of claim 26 wherein the restriction data corresponds to at least one privilege to remove from the restricted access token relative to a parent access token.

40. The method of claim 26 wherein the restriction data corresponds to at least one security identifier to modify in the restricted access token relative to a parent access token.

41. In a computer server, a system for restricting access of content to resources, comprising, content arranged in a web site, the content having a process set up therefor, a discrimination mechanism configured with executable code to determine at least one restricted security identifier based on information corresponding to the site, a mechanism configured with executable code to automatically derive from a parent token a restricted access token for the process by adding relative to the parent token the at least one restricted security identifier corresponding to the site to the restricted access token, and a security mechanism that determines access of the content's process to a resource by comparing information in the restricted access token to separately maintained security information currently associated with the resource.

42. A method comprising, automatically creating authorization data based on security information in a parent access token and restriction information available to a computer system;

associating the authorization data with a process;

receiving a request for access by the process to a selected resource; and in response to the request, comparing in a security environment the authorization data associated with the process against security information currently associated with the selected resource to determine whether to grant access of the process to the selected resource, the security information currently associated with the selected resource being maintained separately from the authorization data associated with the process.

43. The method of claim 42 wherein the process restriction data is based on an application program.

44. The method of claim 42 wherein the process restriction data is based on a parent process.

45. The method of claim 42 wherein the process restriction data is based on a job.

46. The method of claim 42 wherein the process restriction data is based on a site.

47. The method of claim 42 wherein the authorization data further comprises user or group identity data.

48. The method of claim 42 wherein the authorization data includes certificate information.

49. The method of claim 42 wherein the authorization data is associated with the process via a restricted token, wherein the set of security information associated with the selected resource comprises an access control list, and wherein at least part of the security environment is incorporated into an operating system.

50. A computer-readable medium having computer-executable instructions for performing the method of claim 42.

* * * * *